(12) United States Patent
Ono et al.

(10) Patent No.: US 12,241,170 B2
(45) Date of Patent: Mar. 4, 2025

(54) CARBON DIOXIDE ELECTROLYTIC DEVICE

(71) Applicant: KABUSHIKI KAISHA TOSHIBA, Tokyo (JP)

(72) Inventors: Akihiko Ono, Kita (JP); Yuki Kudo, Yokohama (JP); Yusuke Kofuji, Hiratsuka (JP); Jun Tamura, Chuo (JP); Masakazu Yamagiwa, Yokohama (JP); Yasuhiro Kiyota, Itabashi (JP); Ryota Kitagawa, Setagaya (JP); Satoshi Mikoshiba, Yamato (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 387 days.

(21) Appl. No.: 17/652,160

(22) Filed: Feb. 23, 2022

(65) Prior Publication Data
US 2023/0079481 A1   Mar. 16, 2023

(30) Foreign Application Priority Data

Sep. 15, 2021   (JP) .................................. 2021-150307

(51) Int. Cl.
*C25B 15/08*   (2006.01)
*C25B 1/23*   (2021.01)
(Continued)

(52) U.S. Cl.
CPC ................ *C25B 15/08* (2013.01); *C25B 1/23* (2021.01); *C25B 3/26* (2021.01); *C25B 9/19* (2021.01);
(Continued)

(58) Field of Classification Search
None
See application file for complete search history.

(56) References Cited

U.S. PATENT DOCUMENTS 5,972,196 A * 10/1999 Murphy .................... C25B 1/30
                                                                     205/466
10,208,385 B2   2/2019 Kudo et al.
(Continued)

FOREIGN PATENT DOCUMENTS

CN   108385130 A   8/2018
CN   212152454 U   11/2024
(Continued)

OTHER PUBLICATIONS

Notice of Reasons from Refusal issued Mar. 5, 2024 in Japanese Application No. 2021-150307 with English translation, citing document No. 15 and 24, therein, 7 pgs.
(Continued)

*Primary Examiner* — Harry D Wilkins, III
(74) *Attorney, Agent, or Firm* — Oblon, McClelland, Maier & Neustadt, L.L.P.

(57) ABSTRACT

A carbon dioxide electrolytic device includes an electrolysis cell including: an anode configured to oxidize water to produce oxygen; a cathode configured to reduce carbon dioxide to produce carbon compound; a cathode flow path plate having a surface provided in contact with the cathode and a cathode flow path provided on the surface and facing to the cathode; and a separator provided between the anode and the cathode. The surface has a hydrophilic region provided on the cathode and having a contact angle to water of less than 45 degrees.

17 Claims, 18 Drawing Sheets

(51) Int. Cl.
*C25B 3/26* (2021.01)
*C25B 9/19* (2021.01)
*C25B 9/23* (2021.01)
*C25B 9/60* (2021.01)
*C25B 11/02* (2021.01)

(52) U.S. Cl.
CPC ............. *C25B 9/23* (2021.01); *C25B 9/60* (2021.01); *C25B 11/02* (2013.01)

(56) References Cited

U.S. PATENT DOCUMENTS

| | | |
|---|---|---|
| 11,130,723 B2 | 9/2021 | Kudo et al. |
| 2018/0216243 A1* | 8/2018 | Kudo ............... C25B 9/73 |
| 2018/0265440 A1 | 9/2018 | Kudo et al. |
| 2018/0265994 A1* | 9/2018 | Yamagiwa ......... C25B 9/23 |
| 2018/0274109 A1 | 9/2018 | Kudo et al. |
| 2019/0085470 A1 | 3/2019 | Ono et al. |
| 2020/0002824 A1 | 1/2020 | Kudo et al. |
| 2020/0087233 A1 | 3/2020 | Ono et al. |
| 2020/0087805 A1 | 3/2020 | Ono et al. |
| 2020/0161720 A1 | 6/2020 | Swiegers |
| 2020/0223775 A1 | 7/2020 | Kudo et al. |
| 2021/0292926 A1 | 9/2021 | Ono et al. |
| 2022/0290311 A1 | 9/2022 | Ono et al. |
| 2022/0298651 A1 | 9/2022 | Kitagawa et al. |
| 2022/0298652 A1* | 9/2022 | Yamagiwa ......... C25B 15/02 |

FOREIGN PATENT DOCUMENTS

| | | | |
|---|---|---|---|
| EP | 3 623 501 A1 | 3/2020 | |
| EP | 3 626 858 A1 | 3/2020 | |
| EP | 4151773 A1 * | 3/2023 | ............ C25B 1/23 |
| JP | 2001-273907 A | 10/2001 | |
| JP | 2019-56136 A | 4/2019 | |
| JP | 2019-157252 A | 9/2019 | |
| JP | 2020-45509 A | 3/2020 | |
| JP | 2021-109986 A | 8/2021 | |

OTHER PUBLICATIONS

Ishizaki, Y., et al., "Effects of Channel Structure and Wettability on Liquid Water Transport in Cathode of PEFC", ECS Transactions, 2013, vol. 50, No. 2, pp. 375-384.

Liu, Z. et al. "Electrochemical generation of syngas from water and carbon dioxide at industrially important rates" Journal of $CO_2$ Utilization, 15, (2016) 7 pages.

Ma, S. et al. "Efficient Electrochemical Flow System with Improved Anode for the Conversion of $CO_2$ to CO" Journal of The Electrochemical Society, 161 (10) (2014) 8 pages.

Chinese Office Action dated Dec. 14, 2024, Issued in Chinese Patent Application No. 202210184457.7 (with English translation).

* cited by examiner

FIG. 12
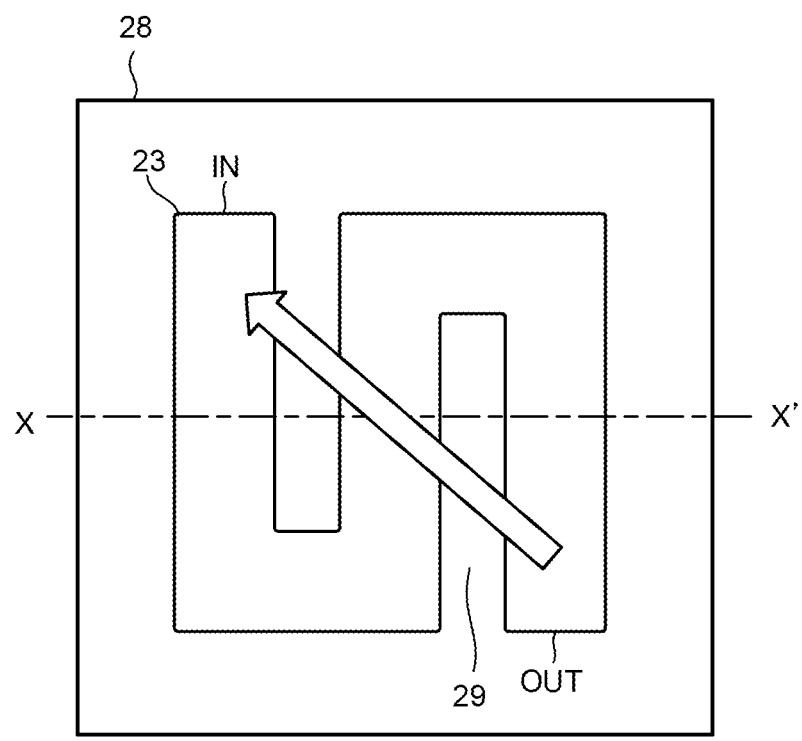
X–X'
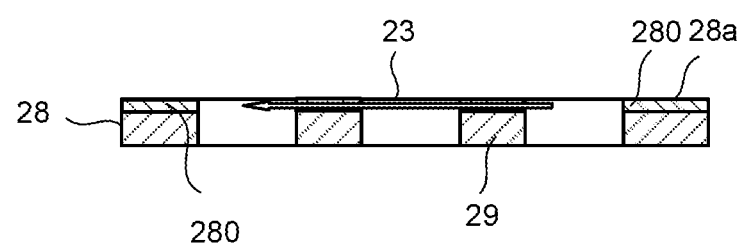

CARBON DIOXIDE ELECTROLYTIC DEVICE

CROSS-REFERENCE TO RELATED APPLICATION

This application is based upon and claims the benefit of priority from Japanese Patent Application No. 2021-150307, filed on Sep. 15, 2021; the entire contents of which are incorporated herein by reference.

FIELD

Embodiments described herein relate generally to a carbon dioxide electrolytic device.

BACKGROUND

In recent years, depletion of fossil fuel such as petroleum or coal has been concerned, and expectation for sustainably-usable renewable energy has been rising. Examples of renewable energy include a solar cell, wind power generation, and the like. Since the amount of electricity generated depends on the weather and natural conditions, there is a problem that it is difficult to ensure a stable supply of electricity. For this reason, attempts are being made to stabilize the supply of electricity by storing the electricity generated by renewable energy in storage batteries. However, when storing the electricity, there are problems such as the cost of storage batteries and the loss that occurs when the electricity is stored.

With respect to such points, some technologies use electricity generated from renewable energy to electrolyze water ($H_2O$) to produce hydrogen ($H_2$) from water or to electrochemically reduce carbon dioxide ($CO_2$) and convert it into a chemical substance (chemical energy) such as a carbon compound such as carbon monoxide (CO), formic acid (HCOOH), methanol ($CH_3OH$), methane ($CH_4$), acetic acid ($CH_3COOH$), ethanol ($C_2H_5OH$), ethane ($C_2H_6$), or ethylene ($C_2H_4$). Storage of these chemical substances in cylinders or tanks has the advantage of lower energy storage costs and less storage loss compared to storing electricity (electric energy) in storage batteries.

As an electrolytic device for carbon dioxide, for example, a structure in which an Ag nanoparticle catalyst is used for a cathode, a cathode solution and $CO_2$ gas are brought into contact with the cathode, and an anode solution is brought into contact with an anode has been studied. An example of a concrete configuration of the electrolytic device includes, for example, a configuration that includes a cathode solution flow path disposed along one surface of the cathode, a $CO_2$ gas flow path disposed along the other surface of the cathode, an anode solution flow path disposed along one surface of the anode, and a separator disposed between the cathode solution flow path and the anode solution flow path. When an electrolytic device having such a configuration is used, for example, to carry out a reaction to produce, for example, CO from $CO_2$ by applying a constant current to the cathode and anode for a long time, there is a problem of degradation of cell performance over time, such as a decrease in a production amount of CO and an increase in cell voltage. Therefore, there is a need for a carbon dioxide electrolytic device that can suppress the degradation of cell performance over time.

BRIEF DESCRIPTION OF THE DRAWINGS

FIG. 12 is a diagram to explain operation of the carbon dioxide electrolytic device according to the first embodiment.

DETAILED DESCRIPTION

A carbon dioxide electrolytic device of an embodiment A includes: the cell comprising: an anode configured to oxidize water to produce oxygen; a cathode configured to reduce carbon dioxide to produce a carbon compound; a cathode flow path plate having a surface and a cathode flow path, the surface being provided on the cathode, and the cathode flow path being provided on the surface and facing to the cathode; and a separator provided between the anode and the cathode. The surface has a hydrophilic region, the hydrophilic region being provided on the cathode and having a contact angle to water of less than 45 degrees.

Hereinafter, embodiments will be described with reference to the drawings. In each embodiment presented below, substantially the same components are denoted by the same codes, and a description thereof is sometimes partially omitted. The drawings are schematic, and a relationship between a thickness and a planar size, thickness proportions of the respective portions, and the like are sometimes different from actual ones.

First Embodiment

Figure 1:
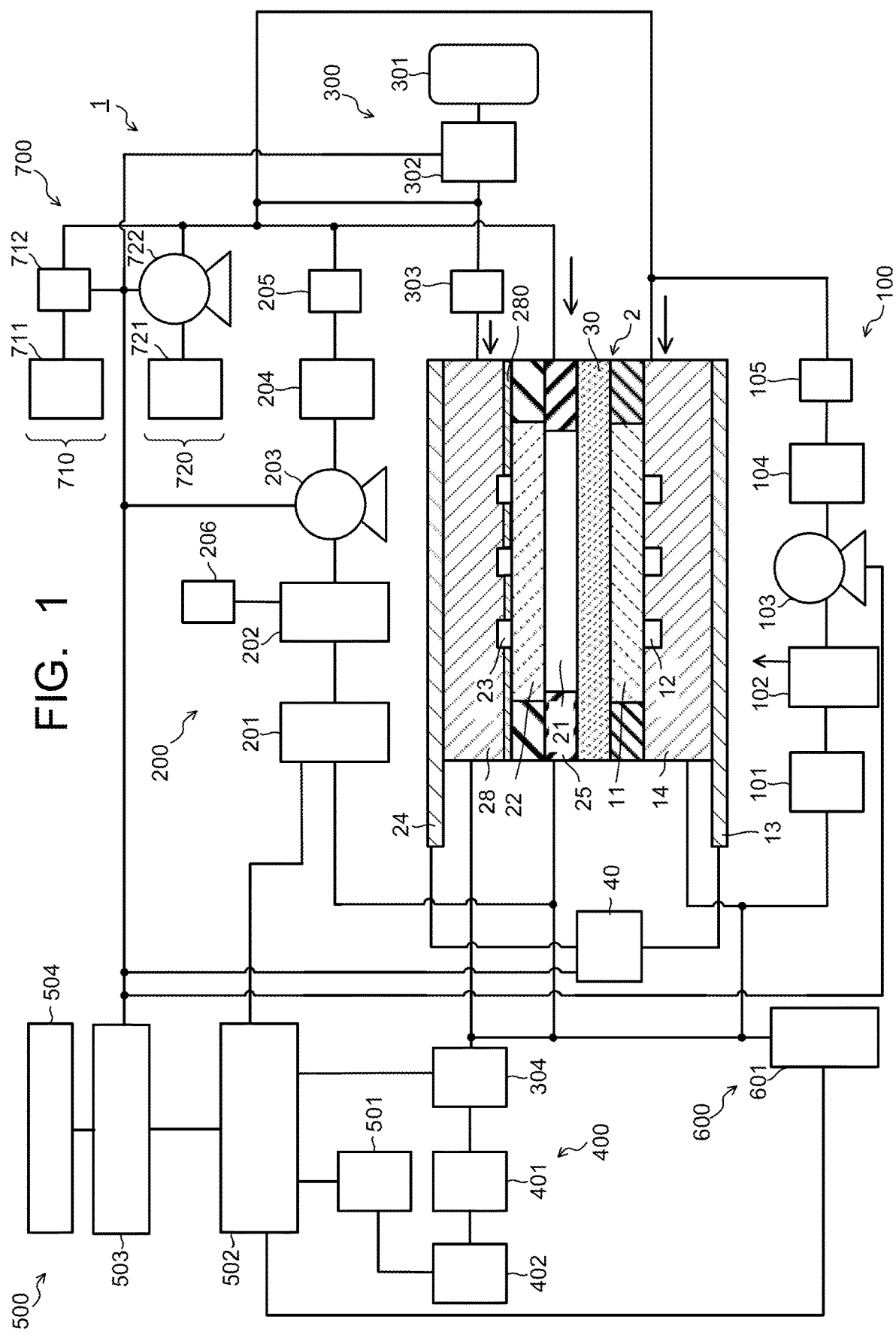
FIG. 1 is a diagram illustrating a configuration of a carbon dioxide electrolytic device according to a first embodiment.
Figure 2:
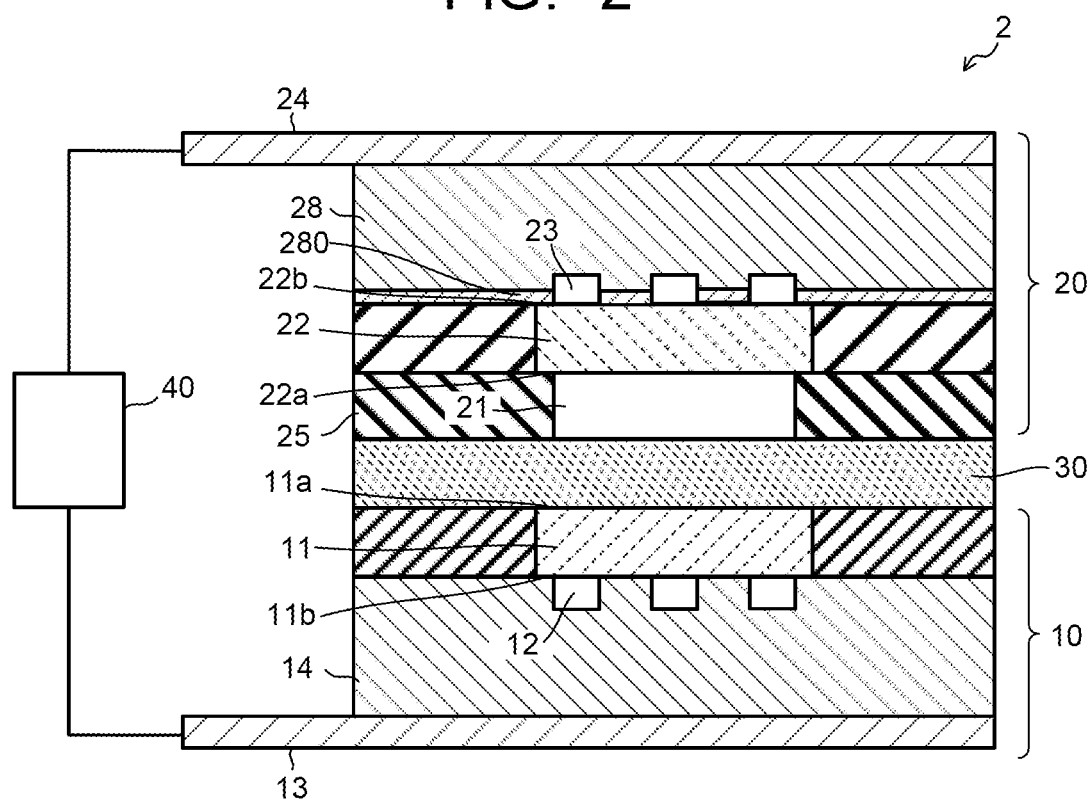
FIG. 2 is a cross-sectional diagram illustrating an electrolysis cell of the carbon dioxide electrolytic device illustrated in FIG. 1.

FIG. 1 is a diagram illustrating a configuration of a carbon dioxide electrolytic device according to a first embodiment, and FIG. 2 is a cross-sectional diagram illustrating a configuration of an electrolysis cell in the electrolytic device illustrated in FIG. 1. A carbon dioxide electrolytic device 1 illustrated in FIG. 1 includes an electrolysis cell 2, an anode solution supply system 100 that supplies an anode solution to the electrolysis cell 2, a cathode solution supply system 200 that supplies a cathode solution to the electrolysis cell 2, a gas supply system 300 that supplies carbon dioxide ($CO_2$) gas to the electrolysis cell 2, a product collection system 400 that collects products produced by a reduction reaction in the electrolysis cell 2, a control system 500 that detects a type and a production amount of the collected products, and performs control of the products and control of a refresh operation, a waste solution collection system 600 that collects waste solutions of the cathode solution and anode solution, and a refresh material supply unit 700 that restores an anode, a cathode, and the like of the electrolysis cell 2. Components necessary for the refresh operation do not necessarily have to be provided.

As illustrated in FIG. 2, the electrolysis cell 2 includes an anode part 10, a cathode part 20, and a separator 30. The anode part 10 includes an anode 11, an anode flow path 12 (anode solution flow path), and an anode current collector 13. The cathode part 20 includes a cathode flow path 21 (cathode solution flow path), a cathode 22, a cathode flow path ($CO_2$ gas flow path) 23, and a cathode current collector 24. The separator 30 is disposed to separate the anode part 10 from the cathode part 20. The anode 11, the anode flow path (anode solution flow path) 12, the anode current collector 13, the cathode flow path 21, the cathode 22, the cathode flow path 23, the cathode current collector 24, and the separator 30 may be laminated with each other. The cathode flow path 21 may not be provided. The electrolysis cell 2 is sandwiched between a pair of not-illustrated support plates, and further tightened by bolts or the like. In FIG. 1 and FIG. 2, a power supply control unit 40 that passes a current through the anode 11 and cathode 22 is provided. The power supply control unit 40 is connected to the anode 11 and cathode 22 through a current introduction member. The power supply control unit 40 is not limited to a normal system power supply, battery, or the like, but may have a power source that supplies electric power generated by renewable energy such as a solar cell, wind power generation, or the like. The power supply control unit 40 may have the above power source, a power controller that adjusts output of the power source to control a voltage between the anode 11 and cathode 22, and the like.

The anode 11 is provided to oxidize substances containing water or hydroxides to produce oxidation products containing oxygen. The anode 11 is an electrode (oxidation electrode) that causes an oxidation reaction of water ($H_2O$) in an anode solution as an electrolytic solution to produce oxygen ($O_2$) and hydrogen ions ($H^+$) or causes an oxidation reaction of hydroxide ions ($OH^-$) generated in the cathode part 20 to produce oxygen ($O_2$) and water ($H_2O$). The anode 11 has a first surface 11a in contact with the separator 30, and a second surface 11b facing the anode flow path 12. The first surface 11a of the anode 11 is in close contact with the separator 30. The anode flow path 12 faces the anode 11, supplies the anode solution to the anode 11 as the electrolytic solution, and is formed of a pit (groove portion/recessed portion) provided at a flow path plate 14 (anode flow path plate). The anode solution flows through the inside of the anode flow path 12 in a manner to be in contact with the anode 11. The anode current collector 13 is in electrical contact with a surface on a side opposite to the anode 11 of the flow path plate 14 that forms the anode flow path 12.

Figure 3:
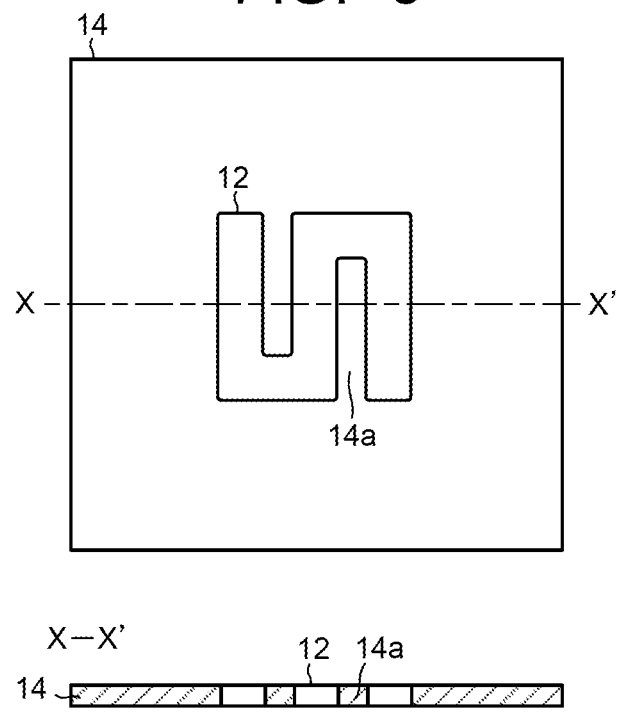
FIG. 3 is a diagram illustrating an example of an anode flow path in the electrolysis cell illustrated in FIG. 2.

The flow path plate 14 is provided with a not-illustrated solution introduction port and solution discharge port, and the anode solution is introduced and discharged by the anode solution supply system 100 through these solution introduction port and solution discharge port. A material having low chemical reactivity and high conductivity is preferably used for the flow path plate 14. Examples of such a material include metal materials such as Ti and SUS, carbon, and the like. A plurality of lands (projections) 14a are preferably provided at the anode flow path 12, as illustrated in FIG. 3. The lands 14a are provided for mechanical retention and electrical continuity. The lands 14a are preferably provided in an alternate manner for uniformizing the flow of the anode solution. Due to the above lands 14a, the anode flow path 12 meanders. In addition, also for successfully discharging the anode solution containing oxygen ($O_2$) gas mixed therein, it is preferable to provide the lands 14a in an alternate manner at the anode flow path 12 to make the anode flow path 12 meander.

The anode 11 is preferably mainly constituted of a catalyst material (anode catalyst material) capable of oxidizing water ($H_2O$) to produce oxygen and hydrogen ions, or oxidizing hydroxide ions ($OH^-$) to produce water and oxygen, and capable of decreasing an overvoltage in such a reaction. Examples of such a catalyst material include metals such as platinum (Pt), palladium (Pd), and nickel (Ni), alloys and intermetallic compounds containing the above metals, binary metal oxides such as a manganese oxide (Mn—O), an iridium oxide (Ir—O), a nickel oxide (Ni—O), a cobalt oxide (Co—O), an iron oxide (Fe—O), a tin oxide (Sn—O), an indium oxide (In—O), a ruthenium oxide (Ru—O), a lithium oxide (Li—O), and a lanthanum oxide (La—O), ternary metal oxides such as Ni—Co—O, Ni—Fe—O, La—Co—O, Ni—La—O, and Sr—Fe—O, quaternary metal oxides such as Pb—Ru—Ir—O and La—Sr—Co—O, and metal complexes such as a Ru complex and a Fe complex.

The anode 11 includes a base material having a structure capable of moving the anode solution and ions between the separator 30 and the anode flow path 12, for example, a porous structure such as a mesh material, a punching material, a porous body, or a metal fiber sintered compact. The base material may be constituted of a metal such as titanium (Ti), nickel (Ni), or iron (Fe), or a metal material such as an alloy (for example, SUS) containing at least one of these metals, or may be constituted of the above-described anode catalyst material. When the oxide is used as the anode catalyst material, a catalyst layer is preferably formed by attaching or laminating the anode catalyst material on a surface of the base material made of the above-described metal material. The anode catalyst material preferably has nanoparticles, a nanostructure, a nanowire, or the like for the purpose of increasing the oxidation reaction. The nanostructure is a structure in which nanoscale irregularities are formed on a surface of the catalyst material.

The cathode 22 is provided to produce reduction products including carbon compounds by reducing substances containing carbon dioxide. The cathode 22 is an electrode (reduction electrode) that causes a reduction reaction of carbon dioxide ($CO_2$) and a reduction reaction of the carbon compounds produced thereby to produce carbon compounds such as carbon monoxide (CO), methane ($CH_4$), ethane ($C_2H_6$), ethylene ($C_2H_4$), methanol ($CH_3OH$), ethanol ($C_2H_5OH$), and ethylene glycol ($C_2H_6O_2$). In the cathode 22, a side reaction in which hydrogen ($H_2$) is produced by a reduction reaction of water ($H_2O$) is caused simultaneously with the reduction reaction of carbon dioxide ($CO_2$) in some cases. The cathode 22 has a first surface 22a facing the cathode flow path 21, and a second surface 22b facing the cathode flow path 23. The cathode flow path 21 is disposed between the cathode 22 and the separator 30 so that the cathode solution as the electrolytic solution is in contact with the cathode 22 and the separator 30.

The cathode flow path 21 faces the cathode 22 and is formed of an opening provided at a flow path plate 25 (cathode flow path plate). The flow path plate 25 is provided with a not-illustrated solution introduction port and solution discharge port, and the cathode solution as the electrolytic solution is introduced and discharged by the cathode solution supply system 200 through these solution introduction port and solution discharge port. The cathode solution flows through the inside of the cathode flow path 21 in a manner to be in contact with the cathode 22 and the separator 30. A material having low chemical reactivity and no conductivity is preferably used for the flow path plate 25 forming the cathode flow path 21. Examples of such a material include insulating resin materials such as an acrylic resin, polyetheretherketone (PEEK), and a fluorocarbon resin. The cathode flow path 21 does not have to be provided as it leads to an increase in cell resistance.

Figure 4:
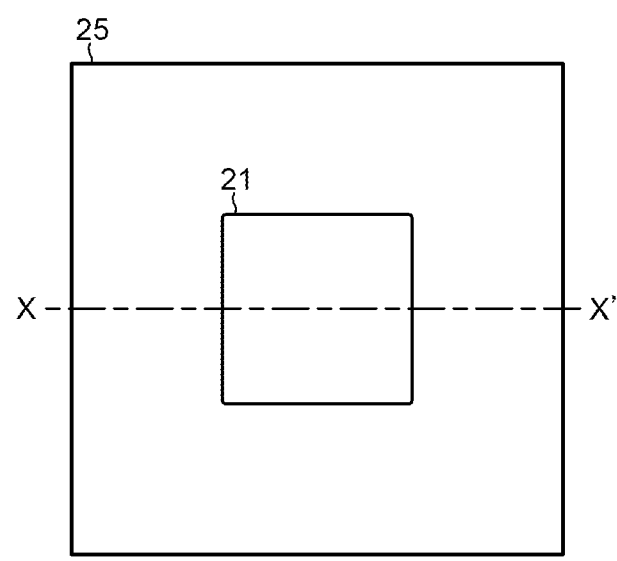
FIG. 4 is a diagram illustrating an example of a cathode flow path in the electrolysis cell illustrated in FIG. 2.
Figure 5:
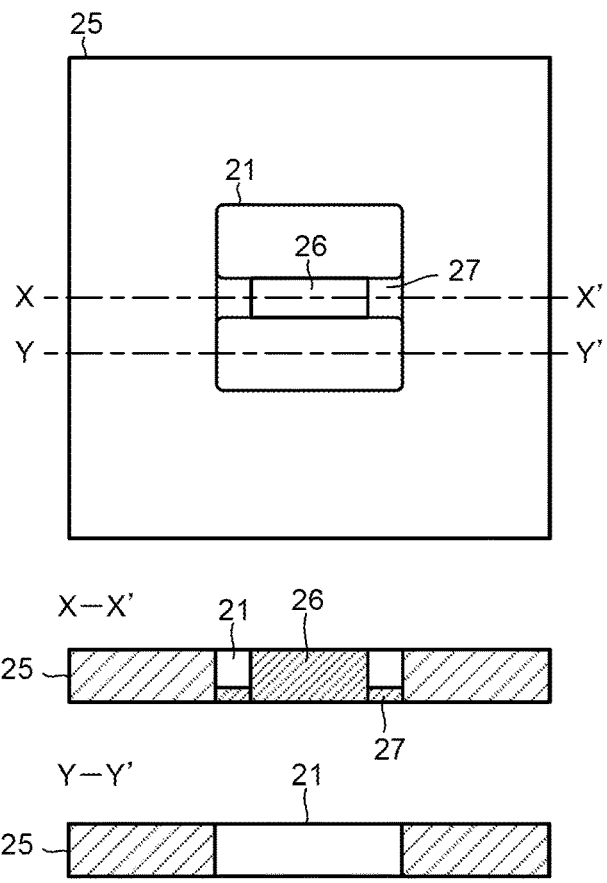
FIG. 5 is a diagram illustrating another example of the cathode flow path in the electrolysis cell illustrated in FIG. 2.

In the cathode 22, the reduction reaction of $CO_2$ occurs mainly in an area that is in contact with the cathode solution. For this reason, the opening with a large opening area is preferably applied to the cathode flow path 21, as illustrated in FIG. 4. Here, a land (projection) 26 may be provided at the cathode flow path 21 to improve mechanical retention and electrical connectivity, as illustrated in FIG. 5. The land 26 of the cathode flow path 21 is provided at the center of the cathode flow path 21 and is held to the flow path plate 25 with a bridge part 27 that is thinner than the land 26 so as not to interfere with the flowing of the cathode solution through the inside of the cathode flow path 21. When the lands 26 are provided at the cathode flow path 21, the number of lands 26 is preferably small to decrease the cell resistance.

At least part of the lands 26 is preferably superimposed on the lands 14a of the flow path plate 14. This provides a good electrical connection and decreases the electrical resistance of the electrolysis cell 2. It also enables good contact between the separator 30 and the anode and cathode catalyst materials, which not only decreases the electrical resistance but also allows the reaction to take place efficiently. At least part of the anode flow path 12 is preferably superimposed on the lands 26. This provides the good electrical connection and decreases the electrical resistance of the electrolysis cell 2. It also enables good contact between the separator 30 and the anode and cathode catalyst materials, which not only decreases the electrical resistance but also allows the reaction to take place efficiently.

The cathode flow path 23 faces the cathode 22 and is formed of a pit (groove portion/recessed portion) provided at a flow path plate (cathode flow path plate) 28. A material having low chemical reactivity and high conductivity is preferably used for the flow path plate 28 forming the cathode flow path 23 where gas containing carbon dioxide flows. Examples of such a material include metal materials such as Ti and SUS, carbon, and the like. The flow path plate 14, the flow path plate 25, and the flow path plate 28 are provided with a not-illustrated introduction port and discharge port for a solution and gas, as well as screw holes for tightening, or the like. Further, at the front and the rear of each of the flow path plates 14, 25, and 28, not-illustrated packing is sandwiched as needed.

Figure 6:
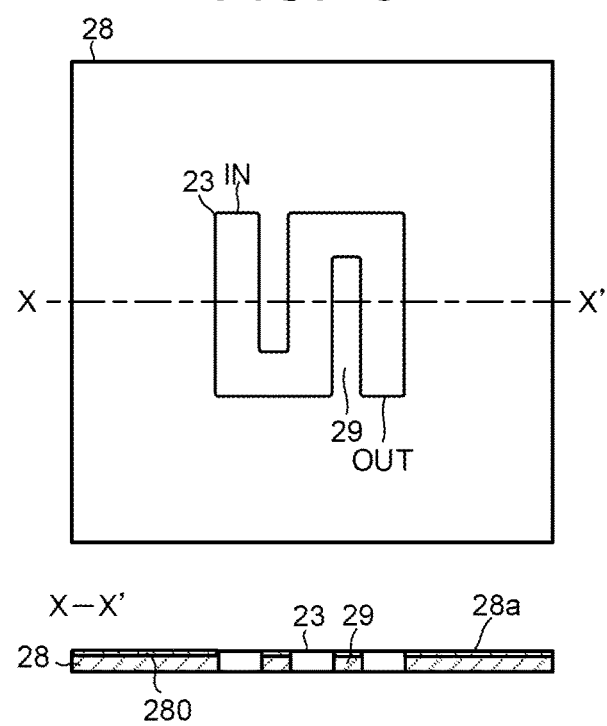
FIG. 6 is a diagram illustrating an example of a cathode flow path in the electrolysis cell illustrated in FIG. 2.

The flow path plate 28 is provided with a not-illustrated gas introduction port and gas discharge port, and $CO_2$ gas or gas containing $CO_2$ (sometimes collectively referred to as simply $CO_2$ gas.) is introduced and discharged by the gas supply system 300 through these gas introduction port and gas discharge port. The $CO_2$ gas flows through the inside of the cathode flow path 23 in a manner to be in contact with the cathode 22. A plurality of lands (projections) 29 are preferably provided at the cathode flow path 23, as illustrated in FIG. 6. The lands 29 are provided for mechanical retention and electrical continuity. The lands 29 are preferably provided in an alternate manner, and due to the lands 29, the cathode flow path 23 meanders in the same manner as the anode flow path 12. The cathode current collector 24 is in electrical contact with a surface of the flow path plate 28 opposite to the cathode 22.

In the electrolysis cell 2 of the embodiment, a contact area between the anode 11 and the flow path plate 14 forming the anode flow path 12 and a contact area between the cathode 22 and the flow path plate 28 forming the cathode flow path 23 can be increased by providing the lands 14a and 29 at the anode flow path 12 and cathode flow path 23. A contact area between the cathode 22 and the flow path plate 25 forming the cathode flow path 21 can be increased by providing the lands 26 at the cathode flow path 21. These increase the mechanical retention of the electrolysis cell 2, while ensuring good electrical continuity between the anode current collector 13 and the cathode current collector 24, and reduction reaction efficiency or the like of $CO_2$ can be improved.

Furthermore, a surface 28a on the cathode 22 side of the flow path plate 28 has a hydrophilic region 280 in a region in contact with the cathode 22. The hydrophilic region 280 has a contact angle to water of 0 degrees or more and less than 45 degrees. The contact angle is preferably 30 degrees or less, and more preferably 15 degrees or less. The hydrophilic region 280 does not need to be permeable to gas such as carbon dioxide.

The contact angle of the rest of the surface 28a to water may be 45 degrees or more and 180 degrees or less.

FIG. 6 illustrates an example where the hydrophilic region 280 is provided on the entire surface 28a, but the hydrophilic region 280 is not limited to this example and may be provided on at least part of the surface 28a.

The hydrophilic region 280 can be formed, for example, by roughening the surface 28a by attaching carbon particles or the like, by coating the surface 28a with a hydrophilic conductive polymer such as polyacetylene, polythiophene, polyaniline, polypyrrole, or by forming the flow path plate 28 with a hydrophilic material.

Figure 7:
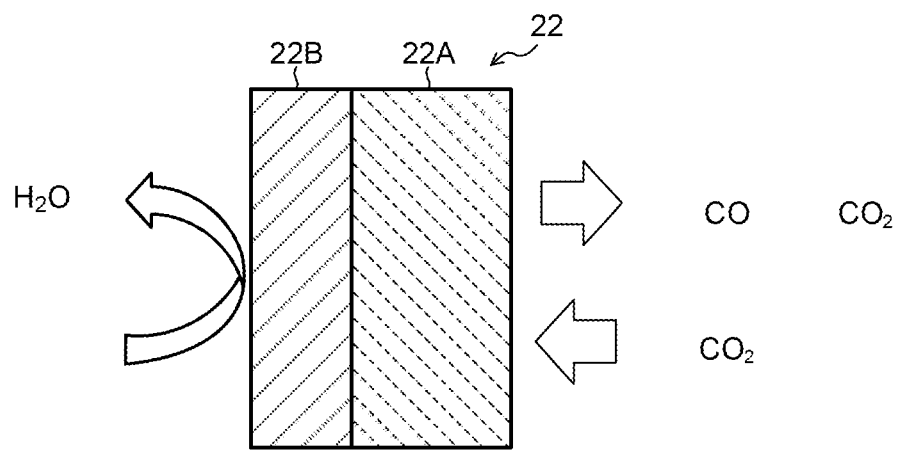
FIG. 7 is a diagram illustrating an example of a cathode in the electrolysis cell illustrated in FIG. 2.
Figure 8:
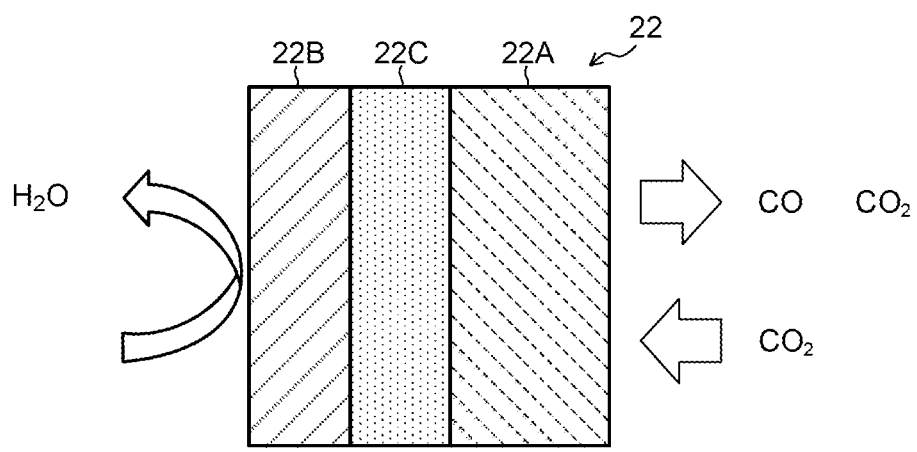
FIG. 8 is a diagram illustrating another example of the cathode in the electrolysis cell illustrated in FIG. 2.
Figure 9:
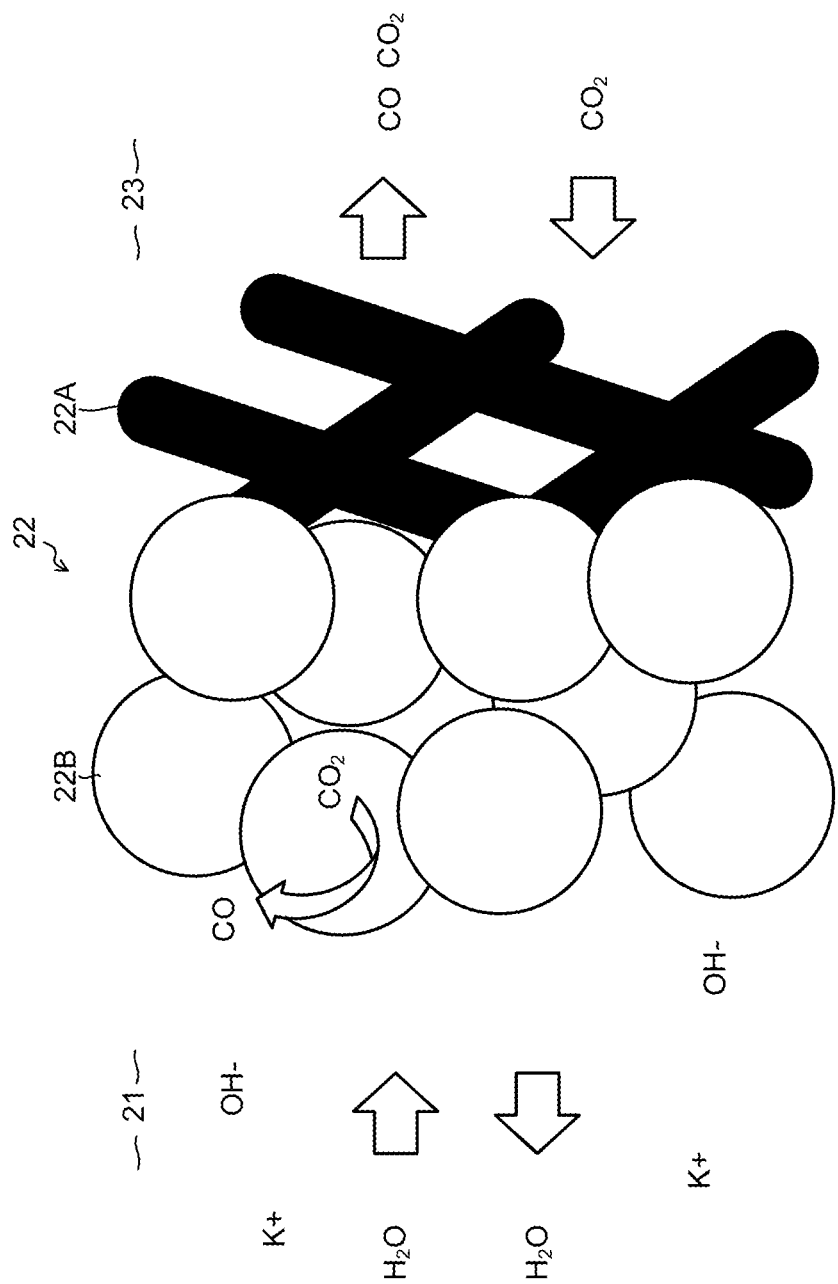
FIG. 9 is a diagram schematically illustrating a reaction at the cathode in the electrolysis cell illustrated in FIG. 2.

As illustrated in FIG. 7, the cathode 22 has a gas diffusion layer 22A and a cathode catalyst layer 22B provided thereon. Between the gas diffusion layer 22A and the cathode catalyst layer 22B, a porous layer 22C denser than the gas diffusion layer 22A may be disposed as illustrated in FIG. 8. As illustrated in FIG. 9, the gas diffusion layer 22A is disposed on the cathode flow path 23 side, and the cathode catalyst layer 22B is disposed on the cathode flow path 21 side. The cathode catalyst layer 22B may enter the gas diffusion layer 22A. The cathode catalyst layer 22B preferably has catalyst nanoparticles, a catalyst nanostructure, or the like. The gas diffusion layer 22A is constituted of, for example, carbon paper, carbon cloth, or the like, and has been subjected to water repellent treatment. The porous layer 22C is constituted of a porous body with a smaller pore size than carbon paper or carbon cloth.

As illustrated in the schematic diagram in FIG. 9, the cathode solution and ions are supplied and discharged from the cathode flow path 21 in the cathode catalyst layer 22B. In the gas diffusion layer 22A, $CO_2$ gas is supplied, and products of the reduction reaction of $CO_2$ gas are discharged from the cathode flow path 23. By applying appropriate water repellent treatment to the gas diffusion layer 22A, $CO_2$ gas reaches the cathode catalyst layer 22B mainly by gas diffusion. The reduction reaction of $CO_2$ and the reduction reaction of the carbon compounds produced thereby occur near a boundary between the gas diffusion layer 22A and the cathode catalyst layer 22B, or near the cathode catalyst layer 22B entering the gas diffusion layer 22A. As a result, gaseous products are mainly discharged from the cathode flow path 23, while liquid products are mainly discharged from the cathode flow path 21.

The cathode catalyst layer 22B is preferably constituted of a catalyst material (cathode catalyst material) capable of reducing carbon dioxide to produce carbon compounds or capable of reducing the produced carbon compounds to produce the carbon compounds according to need, and capable of decreasing an overvoltage in the above reaction. Examples of such a material include metals such as gold (Au), silver (Ag), copper (Cu), platinum (Pt), palladium (Pd), nickel (Ni), cobalt (Co), iron (Fe), manganese (Mn), titanium (Ti), cadmium (Cd), zinc (Zn), indium (In), gallium (Ga), lead (Pb), and tin (Sn), metal materials such as alloys and intermetallic compounds containing at least one of the above metals, carbon materials such as carbon (C), graphene, CNT (carbon nanotube), fullerene, and ketjen black, and metal complexes such as a Ru complex and a Re complex. The cathode catalyst layer 22B can employ various shapes such as a plate shape, a mesh shape, a wire shape, a particle shape, a porous shape, a thin film shape, and an island shape.

The cathode catalyst material constituting the cathode catalyst layer 22B has preferably the nanoparticles of the metal materials, nanostructures of the metal materials, nanowires of the metal materials, or a composite of the nanoparticles of the metal materials carried on carbon materials such as carbon particles, carbon nanotubes, graphene, or the like. By applying catalyst nanoparticles, catalyst nanostructures, catalyst nanowires, catalyst nanocarrier structures, and the like as the cathode catalyst material, the reaction efficiency of the carbon dioxide reduction reaction at the cathode 22 can be enhanced.

The separator 30 is provided between the anode 11 and the cathode 22. The separator 30 is constituted of an ion-exchange membrane or the like capable of making ions move between the anode 11 and the cathode 22, and capable of separating the anode part 10 from the cathode part 20. Examples of the ion-exchange membrane include cation-exchange membranes such as Nafion and Flemion and anion-exchange membranes such as Neosepta and Selemion. As described below, when an alkaline solution is used as the anode and cathode solutions, and assuming mainly the move of hydroxide ions (OW), the separator 30 is preferably constituted of the anion-exchange membrane. However, glass filters, porous polymer membranes, porous insulating materials, and the like can be applied to the separator 30 as long as the material is capable of moving ions between the anode 11 and cathode 22, in addition to the ion-exchange membrane.

For the anode and cathode solutions as the electrolytic solution, a solution containing at least water ($H_2O$) is preferably used. Since carbon dioxide ($CO_2$) is supplied from the cathode flow path 23, the cathode solution may or may not contain carbon dioxide ($CO_2$). The same solution or a different solution may be applied to the anode and cathode solutions. The solution containing $H_2O$ to be used as the anode and cathode solutions can be an aqueous solution containing an arbitrary electrolyte. Examples of the aqueous solution containing electrolytes include an aqueous solution containing at least one selected from, for example, hydroxide ions (OW), hydrogen ions ($H^+$), potassium ions ($K^+$), sodium ions ($Na^+$), lithium ions ($Li^+$), chloride ions ($Cl^-$), bromide ions ($Br^-$), iodide ions ($I^-$), nitrate ions ($NO_3^-$), sulfate ions ($SO_4^{2-}$), phosphate ions ($PO_4^{2-}$), borate ions ($BO_3^{3-}$), and bicarbonate ions ($HCO_3^-$). It is preferable to use an alkaline solution in which an electrolyte such as potassium hydroxide or sodium hydroxide is dissolved in a high concentration as the anode and cathode solutions to decrease the electrical resistance of the electrolytic solution.

An ionic liquid that consists of salts of cations such as imidazolium ions or pyridinium ions and anions such as $BF_4^-$ or $PF_6^-$ and is in a liquid state in a broad temperature range, or an aqueous solution thereof can be used as the cathode solution. Other cathode solutions include amine solutions such as ethanolamine, imidazole, or pyridine, or aqueous solutions thereof. The amine may be any one of a primary amine, a secondary amine, and a tertiary amine.

The anode solution is supplied to the anode flow path 12 of the anode part 10 as the electrolytic solution from the anode solution supply system 100. The anode solution supply system 100 circulates the anode solution so that the anode solution flows through the anode flow path 12. The anode solution supply system 100 has a pressure controller 101, an anode solution tank 102, a flow rate controller (pump) 103, a reference electrode 104, and a pressure gauge 105, and is configured to circulate the anode solution through the anode flow path 12. The anode solution tank 102 is connected to a not-illustrated gas component collector that collects gas components such as oxygen (02) contained in the circulating anode solution. The anode solution is introduced into the anode flow path 12 after its flow rate and pressure are controlled in the pressure controller 101 and the flow rate controller 103.

The cathode solution is supplied to the cathode flow path 21 of the cathode part 20 from the cathode solution supply system 200. The cathode solution supply system 200 circulates the cathode solution so that the cathode solution flows through the cathode flow path 21. The cathode solution supply system 200 has a pressure controller 201, a cathode solution tank 202, a flow rate controller (pump) 203, a reference electrode 204, and a pressure gauge 205, and is configured to circulate the cathode solution through the cathode flow path 21. The cathode solution tank 202 is connected to a gas component collector 206 that collects gas components such as carbon monoxide (CO) contained in the circulating cathode solution. The cathode solution is introduced into the cathode flow path 21 after its flow rate and pressure are controlled in the pressure controller 201 and the flow rate controller 203.

$CO_2$ gas is supplied to the cathode flow path 23 from the gas supply system 300. The gas supply system 300 has a $CO_2$ gas cylinder 301, a flow rate controller 302, a pressure gauge 303, and a pressure controller 304. The $CO_2$ gas is introduced into the cathode flow path 23 after its flow rate and pressure are controlled in the flow rate controller 302 and the pressure controller 304. The gas supply system 300 is connected to the product collection system 400 that collects products in the gas flowing through the cathode flow path 23. The product collection system 400 has a gas/liquid separator 401 and a product collector 402. Reduction products such as CO and $H_2$ contained in the gas flowed through the cathode flow path 23 are accumulated in the product collector 402 through the gas/liquid separator 401.

The anode and cathode solutions circulate through the anode flow path 12 and cathode flow path 21 at the time of an electrolytic reaction operation as described above. At the time of a later-described refresh operation of the electrolysis cell 2, the anode and cathode solutions are discharged to the waste solution collection system 600 so that the anode 11, the anode flow path 12, the cathode 22, the cathode flow path 21, and the like are exposed from the anode and cathode solutions. The waste solution collection system 600 has a waste solution collection tank 601 connected to the anode flow path 12 and cathode flow path 21. Waste solutions of the anode and cathode solutions are collected into the waste solution collection tank 601 by opening and closing not-illustrated valves. The opening and closing of the valves and the like are controlled collectively by the control system 500. The waste solution collection tank 601 also functions as a collection unit of a rinse solution supplied from the refresh material supply unit 700. Further, gaseous substances supplied from the refresh material supply unit 700 and partially containing liquid substances, are also collected by the waste solution collection tank 601 as needed.

The refresh material supply unit 700 includes a gaseous substance supply system 710 and a rinse solution supply system 720. Note that the rinse solution supply system 720 can be omitted according to circumstances. The gaseous substance supply system 710 has a gas tank 711 that is a supply source of gaseous substances such as air, carbon dioxide, oxygen, nitrogen, or argon, and a pressure controller 712 that controls a supply pressure of the gaseous substances. The rinse solution supply system 720 has a rinse solution tank 721 that is a supply source of a rinse solution such as water and a flow rate controller (pump) 722 that controls a supply flow rate or the like of the rinse solution. The gaseous substance supply system 710 and the rinse solution supply system 720 are connected to the anode flow path 12, cathode flow path 21, and the cathode flow path 23 through pipes. The gaseous substances and rinse solution are supplied to each of the flow paths 12, 21, and 23 by opening and closing not-illustrated valves. The opening and closing of the valves and the like are controlled collectively by the control system 500.

A part of the reduction products accumulated in the product collector 402 is sent to a reduction performance detector 501 of the control system 500. In the reduction performance detector 501, a production amount and a proportion of each product such as CO or $H_2$ in the reduction products are detected. The detected production amount and proportion of each product are input into a data collector and controller 502 of the control system 500. Further, the data collector and controller 502 collects electrical data such as a cell voltage, a cell current, a cathode potential, and an anode potential and data such as pressure and pressure loss inside the anode solution flow path and the cathode solution flow path as part of cell performance of the electrolysis cell 2, and sends these data to a refresh controller 503.

The data collector and controller 502 is electrically connected, through bi-directional signal lines whose illustrations are partially omitted, to the power supply control unit 40, the pressure controller 101 and the flow rate controller 103 of the anode solution supply system 100, the pressure controller 201 and the flow rate controller 203 of the cathode solution supply system 200, the flow rate controller 302 and the pressure controller 304 of the gas supply system 300, and the pressure controller 712 and the flow rate controller 722 of the refresh material supply unit 700, in addition to the reduction performance detector 501, and these are collectively controlled. Note that each pipe is provided with not-illustrated valves, and an opening/closing operation of the valves is also controlled by a signal from the data collector and controller 502. The data collector and controller 502 may control the operation of the above components during the electrolysis operation, for example.

The refresh controller 503 is electrically connected, through bi-directional signal lines whose illustrations are partially omitted, to the power supply control unit 40, the flow rate controller 103 of the anode solution supply system 100, the flow rate controller 203 of the cathode solution supply system 200, the flow rate controller 302 of the gas supply system 300, and the pressure controller 712 and the flow rate controller 722 of the refresh material supply unit 700, and these are collectively controlled. Note that each pipe is provided with not-illustrated valves, and an opening/closing operation of the valves is also controlled by a signal from the refresh controller 503. The refresh controller 503 may control the operation of the above components during the electrolysis operation, for example. The refresh controller 503 and the data collector and controller 502 may be constituted by a single controller.

Figure 10:
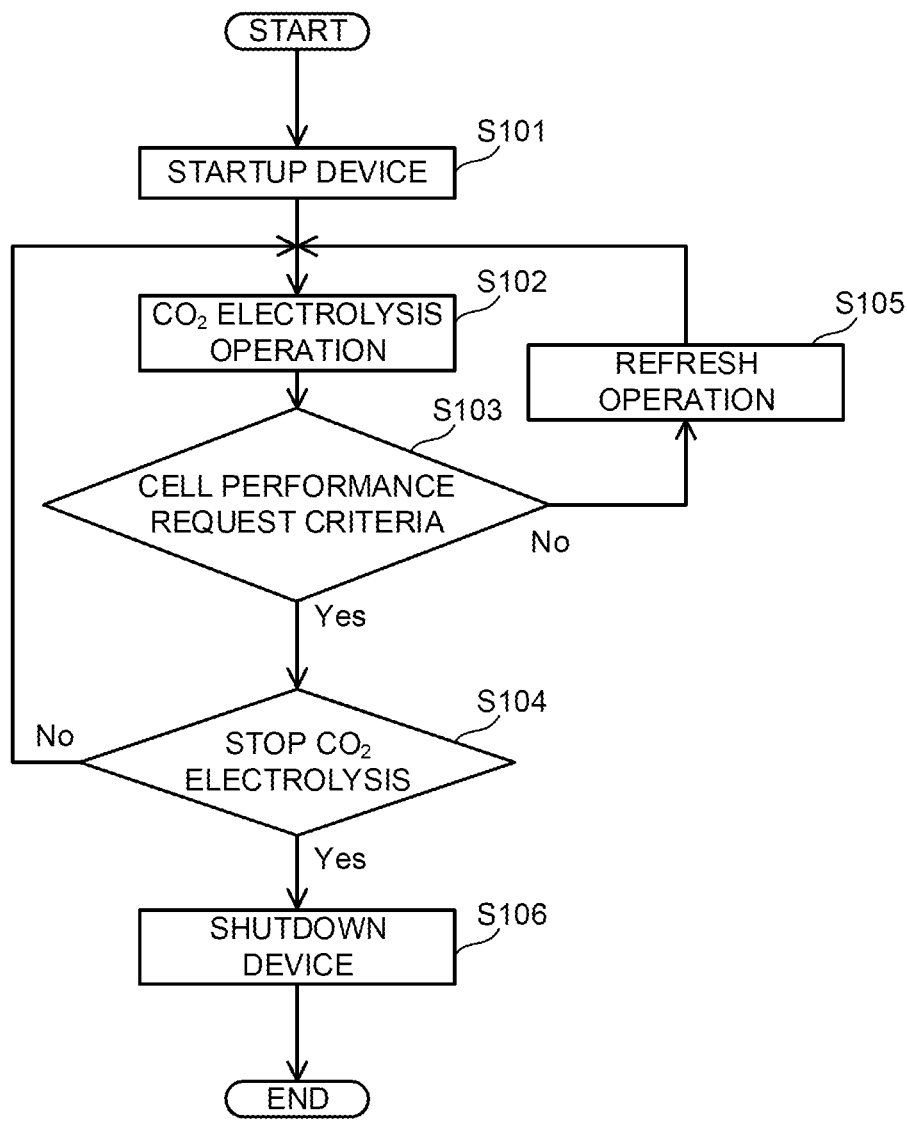
FIG. 10 is a diagram illustrating an operation step of the carbon dioxide electrolytic device according to the first embodiment.

An operating operation of the carbon dioxide electrolytic device 1 of the embodiment will be described. First, as illustrated in FIG. 10, a startup step S101 of the electrolytic device 1 is performed. In the startup step S101 of the electrolytic device 1, the following operations are performed. In the anode solution supply system 100, the anode solution is introduced into the anode flow path 12 after its flow rate and pressure are controlled in the pressure controller 101 and the flow rate controller 103. In the cathode solution supply system 200, the cathode solution is introduced into the cathode flow path 21 after its flow rate and pressure are controlled in the pressure controller 201 and the flow rate controller 203. In the gas supply system 300, $CO_2$ gas is introduced into the cathode flow path 23 after its flow rate and pressure are controlled in the flow rate controller 302 and the pressure controller 304.

Next, a $CO_2$ electrolysis operation step S102 is performed. In the $CO_2$ electrolysis operation step S102, application of a bath voltage by the power supply control unit 40 of the electrolytic device 1 that has been subjected to the startup step S101 is started, and a current is supplied by applying a voltage between the anode 11 and cathode 22.

When the current is applied between the anode 11 and cathode 22, an oxidation reaction near the anode 11 and a reduction reaction near the cathode 22 occur, which will be described below. Here, the case when carbon monoxide (CO) is produced as the carbon compound is mainly explained. However, the carbon compounds as the reduction products of carbon dioxide are not limited to carbon monoxide but can be other carbon compounds such as the organic compounds mentioned above. A reaction process by the electrolysis cell 2 may be the case mainly producing hydrogen ions ($H^+$) or the case mainly producing hydroxide ions ($OH^-$) but is not limited to either of these reaction processes.

First, the reaction process when water ($H_2O$) is mainly oxidized to produce hydrogen ions ($H^+$) is described. When the current is supplied from the power supply control unit 40 between the anode 11 and cathode 22, the oxidation reaction of water ($H_2O$) occurs at the anode 11 that is in contact with the anode solution. Concretely, as shown in Equation (1) below, $H_2O$ contained in the anode solution is oxidized to produce oxygen ($O_2$) and hydrogen ions ($H^+$).

$$2H_2O \rightarrow 4H^+ + O_2 + 4e^- \quad (1)$$

$H^+$ produced at the anode 11 moves through the anode solution present in the anode 11, the separator 30, and the cathode solution in the cathode flow path 21 to reach near the cathode 22. Electrons ($e^-$) based on the current supplied to the cathode 22 from the power supply control unit 40 and $H^+$ that moves near the cathode 22 cause the reduction reaction of carbon dioxide ($CO_2$). Concretely, as shown in Equation (2) below, $CO_2$ supplied to the cathode 22 from the cathode flow path 23 is reduced to produce CO.

$$2CO_2 + 4H^+ + 4e^- \rightarrow 2CO + 2H_2O \quad (2)$$

Next, the reaction process when carbon dioxide ($CO_2$) is mainly reduced to produce hydroxide ions (OH) is described. When the current is supplied from the power supply control unit 40 between the anode 11 and cathode 22, water ($H_2O$) and carbon dioxide ($CO_2$) are reduced near the cathode 22 to produce carbon monoxide (CO) and hydroxide ions (OH), as shown in Equation (3) below. The hydroxide ions (OH) diffuse near the anode 11, and as shown in Equation (4) below, hydroxide ions (OH) are oxidized to produce oxygen ($O_2$).

$$2CO_2 + 2H_2O + 4e^- \rightarrow 2CO + 4OH^- \quad (3)$$

$$4OH^- \rightarrow 2H_2O + O_2 + 4e^- \quad (4)$$

In the above-described reaction process at the cathode 22, the reduction reaction of $CO_2$ is considered to occur near the boundary between the gas diffusion layer 22A and the cathode catalyst layer 22B, as described above. In this event, the cathode solution flowing through the cathode flow path 21 enters up to the gas diffusion layer 22A or the cathode catalyst layer 22B has excess water, thus causing such trouble that the production amount of CO produced by the reduction reaction of $CO_2$ decreases, the cell voltage increases, and the like. The degradation of the cell performance of the electrolysis cell 2 as above is also caused by an uneven distribution of ions and residual gas near the anode 11 and cathode 22, excess water of the cathode catalyst layer 22B, precipitation of electrolytes in the cathode 22 and anode 11, precipitation of electrolytes in the anode flow path 12 and cathode flow path 21, and the like.

Further, the electrolysis operation may cause precipitation of salts in the cathode flow path 21 and the gas diffusion layer 22A, thereby blocking the flow path or decreasing the gas diffusibility, resulting in the degradation of the cell performance. This is because ions move between the anode 11 and cathode 22 through the separator 30 and the ion-exchange membrane, and the ions react with the gas components. For example, when a potassium hydroxide solution is used for the anode solution and carbon dioxide gas is used for the cathode gas, potassium ions move from the anode 11 to cathode 22, and the ions react with carbon dioxide to generate salts such as potassium hydrogen carbonate or potassium carbonate. When the above salts are solubility or less in the cathode flow path 21 and the gas diffusion layer 22A, the salts precipitate in the cathode flow path 21 and the gas diffusion layer 22A. The blockage of the flow path prevents the uniform gas flow throughout the cell and decreases the cell performance. The decrease in cell performance is especially noticeable when a plurality of cathode flow paths 21 are provided. In some cases, the performance of the cell itself can be improved by partially increasing the gas flow rate or the like. This is because the increase in the gas pressure improves the cell performance by increasing the gas components or the like supplied to the catalyst or by increasing gas diffusibility. A step S103 to judge whether the cell performance meets the required criteria is performed to detect such degradation of the cell performance.

The data collector and controller 502 periodically or continuously collects, for example, the production amount and the proportion of each product, and the cell performance such as the cell voltage, the cell current, the cathode potential, the anode potential, the pressure inside the anode flow path 12, and the pressure inside the cathode flow path 21 of the electrolysis cell 2, as described above. Further, in the data collector and controller 502, the request criteria of the cell performance are previously set, and it is judged whether the collected data satisfy the set request criteria. When the collected data satisfy the set request criteria, the $CO_2$ electrolysis operation S102 is continued without performing a $CO_2$ electrolysis stop (S104). When the collected data do not satisfy the set request criteria, a refresh operation step S105 is performed.

The cell performance collected by the data collector and controller 502 is defined by parameters such as, for example, an upper limit value of the cell voltage when a constant current is made to flow through the electrolysis cell 2, a lower limit value of the cell current when a constant voltage is applied to the electrolysis cell 2, and Faradaic efficiency of the carbon compounds produced by the reduction reaction of $CO_2$. Here, the Faradaic efficiency is defined as a proportion of a current contributing to the production of intended carbon compounds with respect to a total current flowing through the electrolysis cell 2. In order to maintain the electrolysis efficiency, the refresh operation step S105 may be performed when the upper limit value of the cell voltage at the time of making the constant current flow reaches 150% or more, preferably 120% or more of a set value. Further, the refresh operation step S105 may be performed when the lower limit value of the cell current at the time of applying the constant voltage reaches 50% or less, preferably 80% or less of a set value. In order to maintain the production amount of the reduction products such as the carbon compounds, the refresh operation step S105 may be performed when the Faradaic efficiency of the carbon compounds becomes 50% or less, preferably 80% or less of a set value.

Regarding the judgment of the cell performance, for example, when at least one parameter of the cell voltage, the cell current, the Faradaic efficiency of the carbon compounds, the pressure inside the anode flow path 12, and the pressure inside the cathode flow path 21 does not satisfy the request criterion, it is judged that the cell performance does not satisfy the request criteria, and the refresh operation step S105 is performed. Further, the request criteria of the cell performance may be set by combining two or more of the above parameters. The refresh operation step S105 may be performed, for example, when both the cell voltage and the Faradaic efficiency of the carbon compounds do not satisfy the request criteria. The refresh operation step S105 is performed when at least one of the parameters of the cell performance does not satisfy the request criterion. In order to stably perform the $CO_2$ electrolysis operation step S102, the refresh operation step S105 is preferably performed at an interval of, for example, one hour or more.

If the required criterion for cell performance is determined based only on any of the cell voltage, the cell current, or the Faraday efficiency of the carbon compounds, it may be determined that refreshment is necessary when salts precipitate in the flow path or gas diffusion layer to cause lowering of output, even if the cell performance is improved or unchanged. In the electrolytic device, it is important to detect the degradation of the cell performance in advance and perform the refresh operation at optimal timing. Therefore, in the electrolytic device of the embodiment, the refresh operation is preferably performed by sensing the salt precipitation by setting the cell pressure (the pressure inside the anode flow path 12, the pressure inside the cathode flow path 21, and the like) as one of the parameters to define the request criteria.

When the electrolysis cell 2 mainly produces CO, for example, it can be determined that the request criteria of the cell performance are not met when hydrogen increases to at least 2 times, preferably 1.5 times or more of a normal level. For example, in the case of CO, it can be determined that the request criteria of the cell performance are not met when CO decreases to at least 0.8 times or less, preferably 0.9 times or less, of a normal level.

The above criterion concentration is arbitrary because it is conceivable that water is decomposed as well as carbon compounds are produced by the electrolysis cell 2. For example, when hydrogen and CO are produced in a ratio of 2:1 and the gas is used by a reactor to produce methanol, a criterion for a change in concentration of the reduction products differs from the above criterion, and it can be determined that the request criteria of the cell performance are not met when the concentration of hydrogen and carbon compounds increases to at least 1.3 times or more, preferably 1.1 times or more of a normal level, or decreases to at least 0.8 times or less, preferably 0.9 times or less, of the normal level.

When salts are detected, the salts are discharged by the rinse solution. However, when a mass transfer amount does not change even after the salts are discharged, it may be determined that leakage has occurred in the electrolysis cell 2. The leakage in the electrolysis cell 2 is not limited to gas leakage between the anode 11 and cathode 22, but includes, for example, gas leakage from between the cathode 22 and cathode flow paths 21, 23. This gas leakage is likely to occur, for example, when the electrolysis cell 2 with salt precipitation is operated for a long time under conditions of high pressure in the cathode flow paths 21, 23.

The determination regarding the necessity of the refresh operation is made based not only on the cell voltage, the current value, and the sensing of salts due to a pressure change in the cell, but also on gas/liquid separation performance between the anode 11 and cathode 22 when the anode 11 and cathode 22 are separated by the separator 30, namely, moving amounts of liquid and gas between the anode 11 and cathode 22, an amount of product, a voltage difference from a reference electrode, an estimated value of the Faradaic efficiency from these parameters, and the like. The estimation of the Faradaic efficiency from each of the parameter values and the necessity of the refresh operation can be comprehensively judged as the determination of the necessity for the refresh operation also from later-described parameters, and any combination of the values and any calculation method are applicable.

The necessity of the refresh operation may be determined from a flooding degree estimated based on each cell data, the pressure change, and the like by an operating method for detecting flooding performance. Further, an operating time of the electrolysis cell 2 may be taken into consideration. The operating time is not limited to an operating time after the operation is started, but may be an integrated value of the operating time so far, a duration, or an operating time after the refresh operation. Further, the operating time may be a calculated value such as multiplication of the integrated voltage value by time, multiplication of the current value by time, and any combination and calculation method thereof can be applied. The calculated values of these combinations are preferable as compared to the determination simply based on the duration or the like since a difference depending on the operating method of the electrolysis cell 2 is also taken into consideration. Furthermore, it is also possible to use a variation value of the current or the voltage, a pH value and a change value of the electrolytic solution, and an oxygen generation amount and variation amount.

It is preferable to perform the operation of determining the necessity of the refresh operation and determine based on the parameters such as the cell voltage at the operation time since the necessity of the refresh operation can be accurately determined although the operating operation time decreases. Note that the time to determine the necessity of the refresh operation in this event is preferably at least half or less of the refresh operation time, more preferably ¼ or less, and ideally ¹⁄₁₀ or less. Regarding each parameter for determining the necessity of the refresh operation, each data of the electrolysis cell 2 is collected via an electronic network, required parameters are derived by the data collector and controllers 502 and the analyzers 504 of a plurality of cells, through analysis such as big data analysis, machine learning or the like, the refresh controller 503 is made to update the request criteria of the cell performance defined by each parameter for determining the necessity of refresh, thereby making it possible to constantly perform the best refresh operation.

Figure 11:
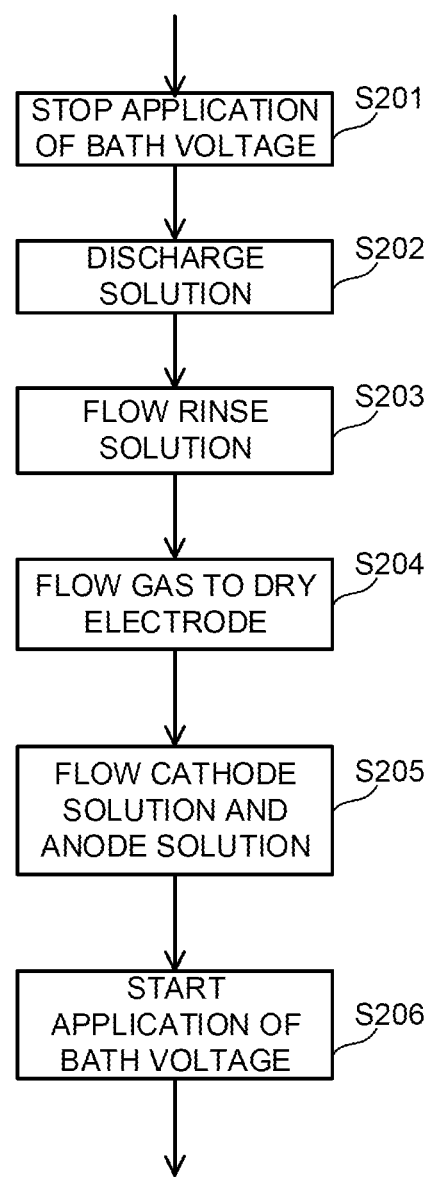
FIG. 11 is a diagram illustrating a refresh step of the carbon dioxide electrolytic device according to the first embodiment.

The refresh operation step S105 is performed according to, for example, a flow chart illustrated in FIG. 11. First, the application of the bath voltage by the power supply control unit 40 is stopped to stop the reduction reaction of $CO_2$ (S201). At this time, the application of the bath voltage does not necessarily have to be stopped. Next, the cathode and anode solutions are discharged from the cathode flow path 21 and the anode flow path 12 (S202). Next, the rinse solution is supplied to the cathode flow path 21 and the anode flow path 12 (S203), to thereby perform washing.

A refresh voltage may be applied between the anode 11 and cathode 22 while the rinse solution is being supplied. This can remove ions and impurities attached to the cathode catalyst layer 22B. When the refresh voltage is applied so that the process is mainly an oxidation process, ions, impurities such as organic matters on a catalyst surface are oxidized and removed. In addition to refreshing the catalyst, ions substituted in an ion-exchange resin when the ion-exchange membrane is used as the separator 30 can be removed by performing this process in the rinse solution.

The refresh voltage is preferably −2.5 V or more and 2.5 V or less, for example. Since energy is used for the refresh operation, a range of the refresh voltage is preferably as narrow as possible, and more preferably −1.5 V or more and 1.5 V or less, for example. The refresh voltage may be applied cyclically so that the oxidation process and a reduction process of ions and impurities are alternately performed. This can accelerate regeneration of the ion-exchange resin and the catalyst. A voltage at a value equivalent to the bath voltage during the electrolysis operation may be applied as the refresh voltage to perform the refresh operation. In this case, a configuration of the power supply control unit 40 can be simplified.

Next, gas is supplied to the cathode flow path 21 and the anode flow path 12 (S204) to dry the cathode 22 and anode 11. Supplying the rinse solution to the cathode flow path 21 and the anode flow path 12 increases a water saturation level in the gas diffusion layer 22A and causes a decrease in output due to gas diffusibility. By supplying the gas, the water saturation level is lowered, thus restoring the cell performance and increasing a refreshing effect. The gas is preferably supplied immediately after the rinse solution flowed through, or at least within 5 minutes after the end of the supply of the rinse solution. This is because the decrease in the output due to the increase in the water saturation level is significant. For example, when the refresh operation is performed every hour, the output during a 5-minute refresh operation may be 0 V or significantly less, and thus 5/60 of the output may be lost.

After the refresh operation is completed, the cathode solution is introduced into the cathode flow path 21, the anode solution is introduced into the anode flow path 12, and the $CO_2$ gas is introduced into the cathode flow path 23 (S205). Then, the application of the bath voltage between the anode 11 and cathode 22 is resumed by the power supply control unit 40 to restart the $CO_2$ electrolysis operation (S206). When the application of the bath voltage has not been stopped in S201, the restart operation is not performed. The gas may be used, or the rinse solution may be used to discharge the cathode and anode solutions from each of the flow paths 12, 21.

The supply and flow of the rinse solution (S203) are performed for the purpose of preventing the precipitation of electrolytes contained in the cathode and anode solutions, and washing of the cathode 22, the anode 11, and the flow paths 12, 21. To this end, water is preferable as the rinse solution, water with an electric conductivity of 1 mS/m or less is more preferable, and water with an electric conductivity of 0.1 mS/m or less is furthermore preferable. To remove the precipitate such as the electrolytes in the cathode 22, anode 11, and the like, an acid rinse solution such as sulfuric acid, nitric acid, hydrochloric acid with a low concentration may be supplied to dissolve the electrolytes. In the case of using the acid rinse solution with the low concentration, a step of supplying the water rinse solution is performed in a subsequent step. The water rinse solution supply step is preferably performed immediately before the gas supply step to prevent additives contained in the rinse solution from remaining. FIG. 1 illustrates the rinse solution supply system 720 having one rinse solution tank 721, but when a plurality of rinse solutions are used, such as water and acid rinse solutions, a plurality of rinse solution tanks 721 are used accordingly.

An acid or alkaline rinse solution is particularly desirable for refreshing the ion-exchange resin. This has the effect of discharging cations and anions that have been substituted for protons and OW in the ion-exchange resin. For this reason, it is preferable to make alternately flow the acid and alkaline rinse solutions, to combine the rinse solution with water having the electrical conductivity of 1 mS/m or less, and to supply gas in between the supply of the plurality of rinse solutions to prevent mixing of the rinse solutions.

The water produced by the reaction may be used as the rinse solution. For example, when CO is produced from $CO_2$ and protons by reduction, water is produced. The water discharged from the cathode 22 at this time can be separated by gas-liquid separation and stored for use. In this way, no new rinse solution needs to be supplied from outside, which is advantageous for the system. The water may be supplied to the cathode flow path 21 by changing a potential to increase a reaction current and increase an amount of water produced. This eliminates the need for a tank for the produced water, as well as piping and pumps for using the water as the rinse solution, making it an effective system configuration. By supplying gas containing oxygen to the cathode flow path 21 and applying a voltage, the electrolytic solution or the rinse solution of the anode 11 is water-decomposed, and the refresh operation may be performed by water produced by a catalyst from protons and OW ions moved to a counter electrode. For example, when Nafion is used as the ion-exchange membrane in an electrolysis cell where $CO_2$ is reduced to CO using a gold catalyst, the protons moved to the cathode 22 react with oxygen by the catalyst to produce water by passing air through to the cathode 22 and applying potential to the cell for water decomposition. This produced water can be used for the refresh operation. After this, hydrogen gas is generated by supplying gas that does not contain oxygen to the cathode 22 or by stopping the gas supply, and the generated hydrogen may be used for the refresh operation drying the cathode 22. In this way, the refresh operation of the catalyst can also be performed by using reducing power of protons and hydrogen.

The gas used for the gas supply and flow step S204 preferably contains at least one of air, carbon dioxide, oxygen, nitrogen, and argon. Furthermore, it is preferable to use the gas with low chemical reactivity. In this regard, air, nitrogen, and argon are preferably used. Nitrogen and argon are even more preferable. The rinse solution and gas for refreshing are not limited to be supplied to only the cathode flow path 21 and the anode flow path 12, but also to the cathode flow path 23 to wash a surface of the cathode 22 in contact with the cathode flow path 23. It is effective to supply the gas to the cathode flow path 23 to dry the cathode 22 from the surface side in contact with the cathode flow path 23 as well.

The above describes the case when the rinse solution and gas for refreshing are supplied to both the anode part 10 and the cathode part 20, but the rinse solution and gas for refreshing may be supplied to only one of the anode part 10 or the cathode part 20. For example, the Faradaic efficiency of the carbon compound varies depending on a contact region between the cathode solution and $CO_2$ in the gas diffusion layer 22A and the cathode catalyst layer 22B of the cathode 22. In such a case, the Faradaic efficiency of the carbon compound may be restored by simply supplying the rinse solution and gas for refreshing only to the cathode part 20. Depending on a type of the electrolytic solution (anode solution and cathode solution) used, there may be a tendency for precipitation to occur on either the anode part 10 or the cathode part 20. Based on this tendency of the electrolytic device 1, the rinse solution and gas for refreshing may be supplied to only one of the anode part 10 or the cathode part 20. Furthermore, depending on the operation time of the electrolytic device 1 and other factors, the cell performance may be restored by simply drying the anode 11 and cathode 22. In such a case, only the gas for refreshing may be supplied to at least one of the anode part 10 and the cathode part 20. The refresh operation step S105 can be changed in various ways depending on the operating conditions and tendencies of the electrolytic device 1.

As mentioned above, in the electrolytic device 1 of the first embodiment, it is judged whether the $CO_2$ electrolysis operation step S102 should be continued or the refresh operation step S105 should be performed based on whether the cell performance of the electrolysis cell 2 meets the request criteria. By supplying the rinse solution and gas for refreshing in the refresh operation step S105, the following factors that cause the cell performance degradation are removed: penetration of the cathode solution into the gas diffusion layer 22A, the excess water in the cathode catalyst layer 22B, uneven distribution of ions and residual gas near the anode 11 and cathode 22, precipitation of electrolytes in the cathode 22, anode 11, anode flow path 12, and cathode flow path 21, and the like. Therefore, the cell performance of the electrolysis cell 2 can be restored by restarting the $CO_2$ electrolysis operation step S102 after the refresh operation step S105. The $CO_2$ electrolysis performance by the electrolytic device 1 can be maintained for a long time by repeating the $CO_2$ electrolysis operation step S102 and the refresh operation step S105 based on the request criteria of the cell performance.

The salt precipitated in the cathode flow path 23 is more likely to precipitate in a first half of the flow path (a side near an inlet IN in a length direction, upstream side) than in a second half (a side near an outlet OUT in the length direction, downstream side). Therefore, by making the rinse solution such as water flow from the outlet OUT to the inlet IN of the cathode flow path 23, the salts precipitated in the cathode flow path 23 can be efficiently eluted. In other words, there is little salt precipitation and the concentration of salts in the introduced rinse solution is low on the outlet OUT side, while there is much salt precipitation and the concentration of salts in the rinse solution is high on the inlet IN side, so the salts can be eluted efficiently with a small amount of rinse solution. However, the flow of the rinse solution increases the amount of water in the gas diffusion layer, which decreases the diffusibility of carbon dioxide, resulting in a phenomenon of the cell performance degradation. This phenomenon is called flooding.

In the cathode flow path 23, the flooding is more likely to occur in the first half part. This is because in the first half of the cathode flow path 23, humidity in the flow path is low and salt precipitation is likely to occur. In the second half of the cathode flow path 23, the gas in the cathode flow path 23 is humidified due to the water in the anode 11 and the water produced by the reaction, to decrease the amount of salt precipitation. In some cases, liquid water may be produced and the salts may dissolve and be discharged. In addition, because more $CO_2$ gas is reacting in the first half of the cathode flow path 23, the amount of $CO_2$ gas in the second half of the cathode flow path 23 decreases, resulting in a decrease in the amount of salt precipitation. This is one of the reasons why the flooding is more likely to occur in the first half of the flow path.

In contrast, in the carbon dioxide electrolytic device of the first embodiment, the hydrophilic region 280 is formed on at least a part of the surface 28a of the flow path plate 28. This allows liquids such as water to move from the second half of the cathode flow path 23, which has a high water content, to the first half as illustrated by an arrow in FIG. 12. In other words, the water condensed in the second half of the cathode flow path 23, the water moved from the anode 11, and the water produced by the reaction can be moved to the flow path plate in the hydrophilic region 280. Therefore, in the first half of the cathode flow path 23, the water moved through the hydrophilic region 280 is vaporized by the temperature of the cell, and the gas in the cathode flow path 23 is humidified. In this way, the hydrophilic region 280 can improve the uniformity of humidity in the cathode flow path 23, and humidification can be performed inside the cell without providing a humidifier.

The water moves through the boundary between the cathode catalyst layer 22B and the hydrophilic region 280 or inside the hydrophilic region 280. This improves the uniformity of the water content in the cathode flow path 23. It can also prevent condensation of water in the cathode flow path 23 and suppress generation of droplets. This can prevent gas-liquid two-phase flow in the cathode flow path 23 and suppress the pressure loss in the cathode flow path 23, thereby decreasing the gas supply pressure and improving the system efficiency. In addition, when cells are laminated to form a stack, a supply amount of gas between cells is uniformized, resulting in higher efficiency.

Since the gas diffusion layer 22A is water-repellent to improve the gas diffusibility and the moving of water in the cathode catalyst layer 22B is poor, the hydrophilic region 280 to move water is effective. In addition, the humidification conditions inside the cell can be thereby made uniform, improving surface uniformity of the reaction. Particularly in the case of an electrolyte membrane, a uniform humidified environment suppresses drying of the membrane and optimizes ion move at any point in the cell surface, thus improving the surface uniformity of the reaction.

Figure 13:
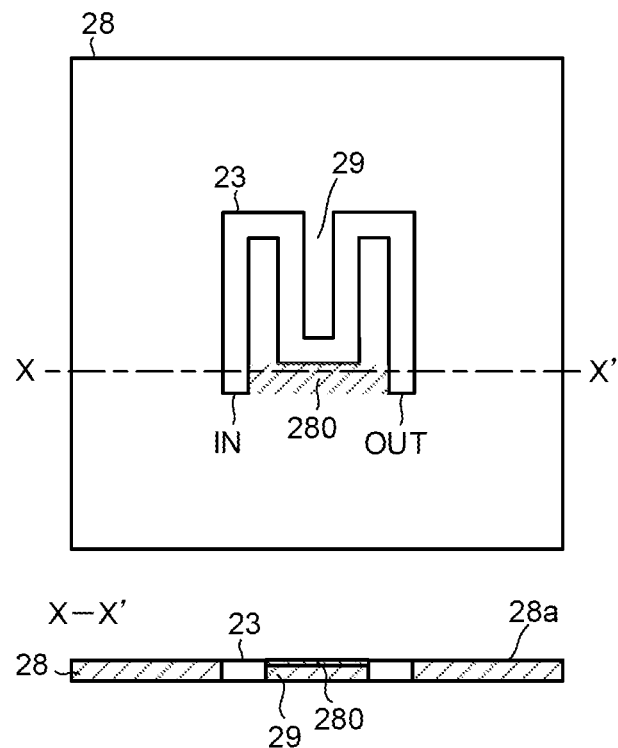
FIG. 13 is a diagram illustrating another example of the cathode flow path in the electrolysis cell illustrated in FIG. 2.

As illustrated in FIG. 13, the hydrophilic region 280 may be provided on the surface 28a, only in a region (land 29) between a flow path region including the inlet IN and a flow path region including the outlet OUT of the cathode flow path 23. The inlet IN of the cathode flow path 23 is one end of the cathode flow path 23 in a length direction on the surface 28a and is connected to the gas introduction port. The outlet OUT of the cathode flow path 23 is the other end of the cathode flow path 23 in the length direction on the surface 28a and is connected to the gas discharge port. A plurality of inlets IN and outlets OUT may be provided.

Figure 14:
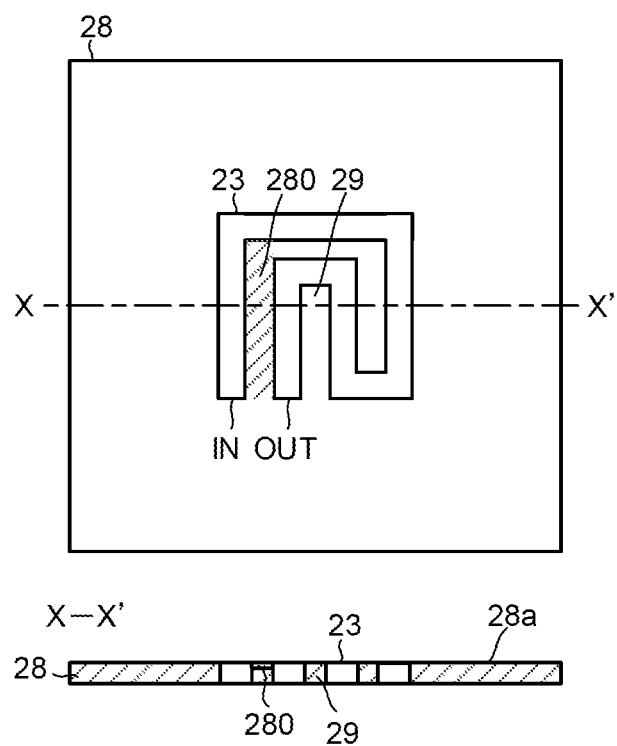
FIG. 14 is a diagram illustrating still another example of the cathode flow path in the electrolysis cell illustrated in FIG. 2.

As illustrated in FIG. 14, the inlet IN and outlet OUT of the cathode flow path 23 may be adjacent to each other on the surface 28a. The hydrophilic region 280 may be provided on the surface 28a between the plurality of flow path regions of the cathode flow path 23, that is, on the land 29. FIG. 14 illustrates an example where the hydrophilic region 280 is provided on the surface 28a between the inlet IN and outlet OUT of the cathode flow path 23.

Figure 15:
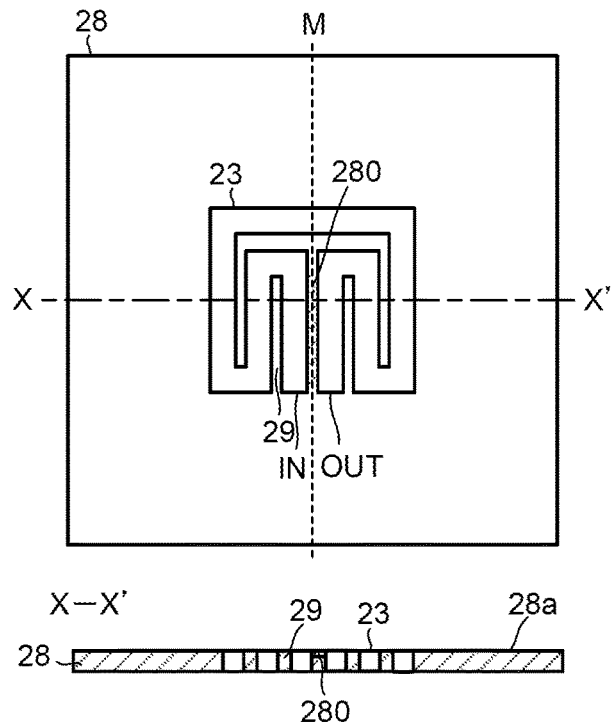
FIG. 15 is a diagram illustrating still another example of the cathode flow path in the electrolysis cell illustrated in FIG. 2.

A planar shape of the cathode flow path 23 may be symmetrical with respect to a midline M of the surface 28a, as illustrated in FIG. 15. The inlet IN and outlet OUT of the cathode flow path 23 may be adjacent to each other on the surface 28a. FIG. 15 illustrates an example where the hydrophilic region 280 is provided on surface 28a between a linear first flow path region including the inlet IN and a linear second flow path region including the outlet of the cathode flow path 23.

Figure 16:
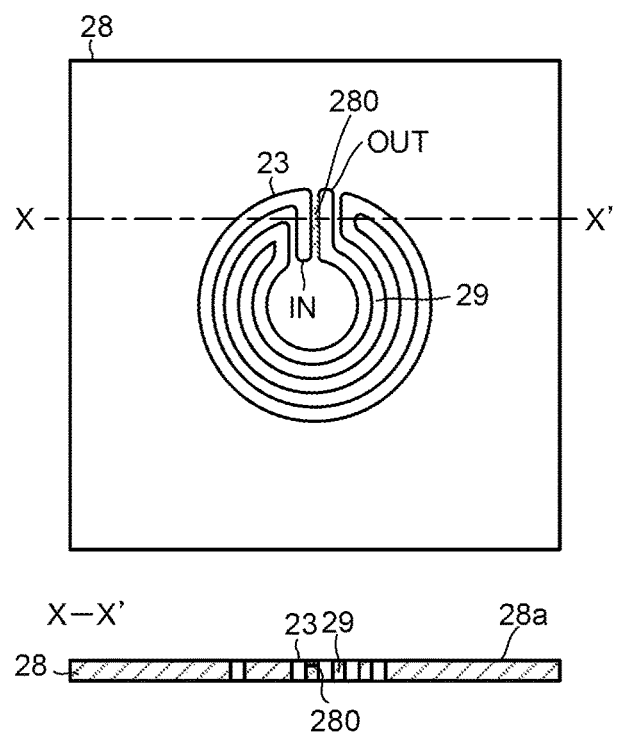
FIG. 16 is a diagram illustrating still another example of the cathode flow path in the electrolysis cell illustrated in FIG. 2.

The planar shape of the cathode flow path 23 may include a plurality of flow path regions extending in a curved state, as illustrated in FIG. 16. FIG. 16 illustrates an example where the hydrophilic region 280 is provided on the surface

28a between the linear first flow path region including the inlet IN and the linear second flow path region including the outlet of the cathode flow path 23.

When the cathode flow path 23 is made hydrophilic, cell resistance can be lowered and the cell performance can be improved by using a material with good electrical contact for a contact surface between the surface 28a and the cathode catalyst layer 22B, but water mobility is lowered because a water moving path depends on a flow path length near the inlet IN and outlet OUT of the cathode flow path 23. On the other hand, when the hydrophilic region 280 is formed only on the land 29 as illustrated in FIG. 13 to FIG. 16, salt precipitation can be effectively suppressed and the surface uniformity of the reaction within the cell surface can be improved due to the uniformity of humidity because the moving of water does not depend on the flow path length near the inlet IN and outlet OUT of the cathode flow path 23. The hydrophilic region 280 may be formed only on the region between the inlet IN and outlet OUT of the cathode flow path 23. It is preferable to form the hydrophilic region 280 only on a part of the region when the electrical contact resistance increases and the cell performance deteriorates by imparting hydrophilicity.

As illustrated in FIG. 14 to FIG. 16, it is preferable to install the inlet IN and the outlet OUT of the cathode flow path 23 adjacent to each other because the moving of water from the second half to the first half of the cathode flow path 23 is thereby promoted. A distance between the inlet IN and outlet OUT is set to a square root or less of a catalyst area to enhance the effect of promoting the moving of water. However, when the distance is too short, the gas in the cathode flow path 23 will move without going through the gas diffusion layer 22A. Therefore, when the inlet IN and outlet OUT are too close, it is necessary to prevent a shortcut of gas by using the gas diffusion layer 22A with MPL and widening a width of the land 29.

A part of an inner wall surface of the cathode flow path 23 may be processed to be hydrophilic. Although a salt precipitation prevention effect is higher when the cathode flow path 23 is processed to be hydrophilic, it is not necessarily necessary to process the cathode flow path 23 to be hydrophilic when the salt precipitation prevention effect can be achieved even if the cathode flow path 23 is not hydrophilic. When the salt precipitation prevention effect is low, it is recommended to perform a combination of supplying humidified $CO_2$ and refreshing salt eluate from the first half of the cathode flow path 23. When the inlet IN and outlet OUT of the cathode flow path 23 are installed adjacent to each other, the salt precipitation prevention effect is effective, and the supply amount of the refresh solution can be reduced and a frequency of refreshing can be reduced. Therefore, the flooding can be prevented even when the refresh operation is performed. When supplying the humidified $CO_2$, a degree of humidification can be decreased, which is more desirable. A concentration of water in the humidified $CO_2$ is, for example, relative humidity at the reaction temperature of 30% or more and 80% or less. For example, when the cell temperature is 60° C., the operation with humidification is possible at around the room temperature to 40° C. In this case, the relative humidity is approximately 50 to 60%, which is preferable because the degree of humidification is less and the flooding can be prevented.

Figure 17:
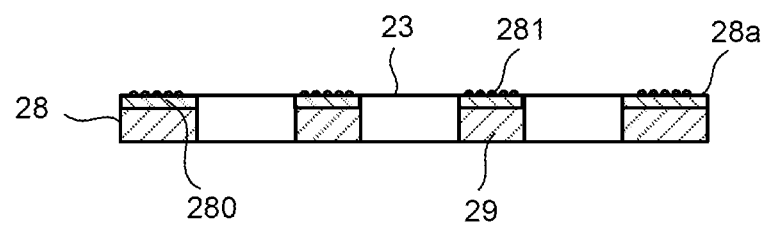
FIG. 17 is a cross-sectional diagram illustrating still another example of the cathode flow path in the electrolysis cell illustrated in FIG. 2.

As illustrated in FIG. 17, a surface of the hydrophilic region 280 may have irregularities 281. The fact that the hydrophilic region 280 has irregularities 281 can effectively promote the moving of water. When an arithmetic mean roughness of the hydrophilic region 280 is extremely large, the shortcut of gas will occur, so average roughness that is sufficient to fill recessed portions with water is preferred. The surface roughness (width of each irregularity) of the hydrophilic region 280 is preferably 0.01 μm or more and 50 μm or less. The average roughness (arithmetic mean roughness) of the hydrophilic region 280 is preferably 10 nm or more and 30 μm or less, and more preferably 1 μm or more and 10 μm or less. A maximum height of the hydrophilic region 280 is preferably 1 μm or more and 50 μm or less. The irregularities 281 decrease surface tension, then the recessed portions are filled with water to prevent gas permeation, which has an effect of suppressing the cell performance degradation due to the shortcut of gas. The irregularities 281 can be formed, for example, by attaching carbon powder to the surface of the surface 28a.

Figure 18:
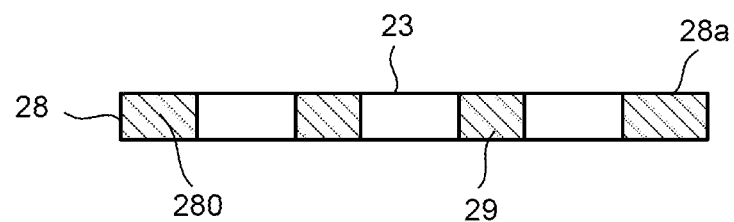
FIG. 18 is a cross-sectional diagram illustrating yet another example of the cathode flow path in the electrolysis cell illustrated in FIG. 2.

As illustrated in FIG. 18, the hydrophilic region 280 may be provided over the entire flow path plate 28. This can be achieved, for example, by forming the flow path plate 28 with a hydrophilic porous body. An average pore size of the hydrophilic porous body is preferably 0.1 μm or more and 10 μm or less. A porosity of the hydrophilic porous body is preferably 30% or more and 80% or less. Other descriptions of the hydrophilic porous body can be adapted appropriately from the description of the hydrophilic region 280. The porosity can be measured, for example, using a mercury intrusion method, an Archimedes method, or a gravimetric porosity method. The average pore size can be measured, for example, by observing a surface or a cross-section using a scanning electron microscope, an optical microscope, or a laser microscope.

By forming the hydrophilic region 280 over the entire flow path plate 28, the moving of water from the second half to the first half of the cathode flow path 23 is promoted, the inside of the cell is humidified uniformly, and humidification can be performed inside the cell without providing a humidifier outside the cell. Furthermore, the water that condensed in the flow path is absorbed by the hydrophilic porous body, preventing condensation water in the flow path and preventing the gas-liquid two-phase flow in the pipe. When the gas-liquid two-phase flow occurs, the pressure loss increases, and the move within the cell and a move balance between cells in a laminated stack decreases, resulting in performance degradation. Furthermore, the pressure loss increases the gas supply pressure, which lowers the overall system efficiency.

Second Embodiment

Figure 19:
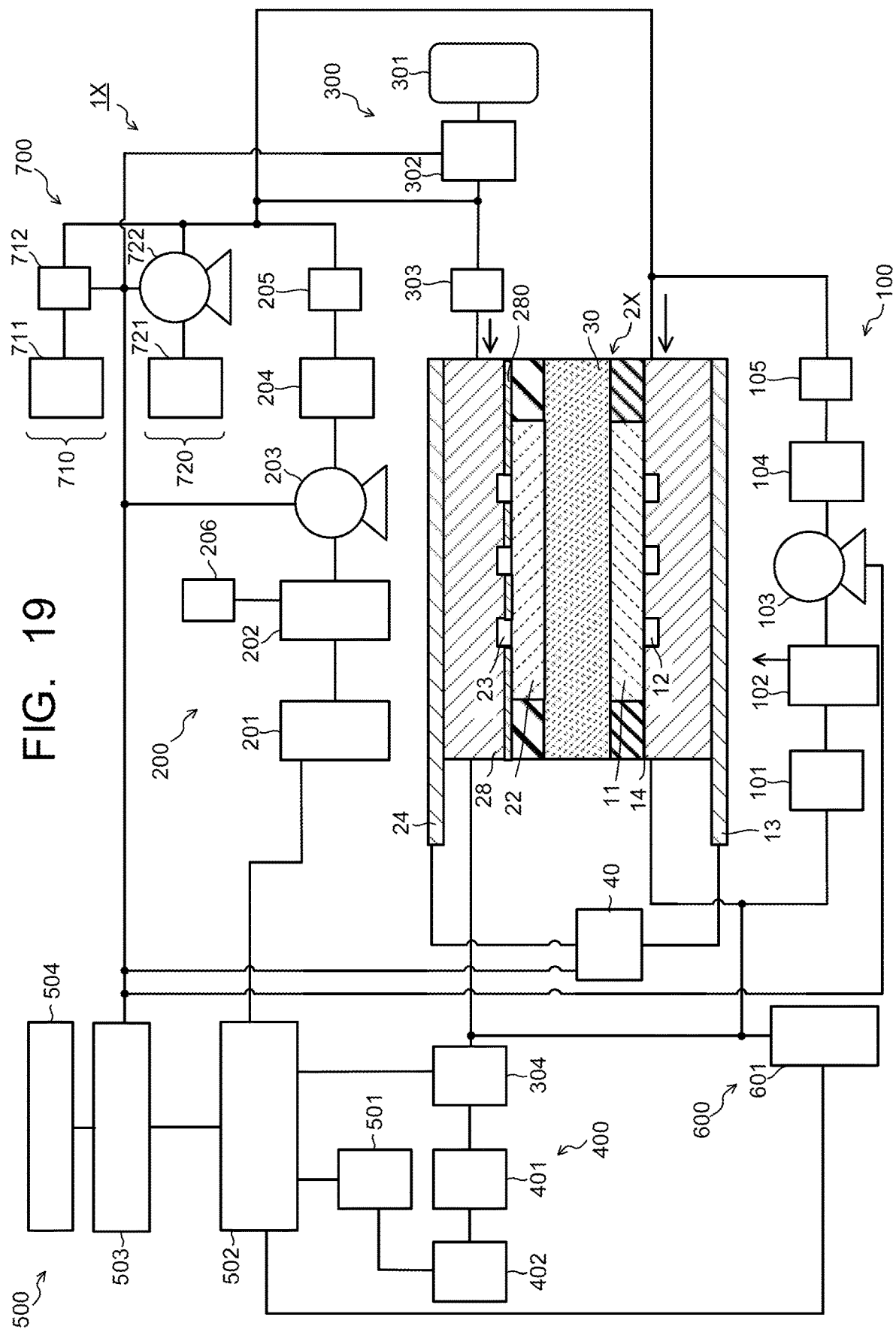
FIG. 19 is a diagram illustrating a carbon dioxide electrolytic device according to a second embodiment.
Figure 20:
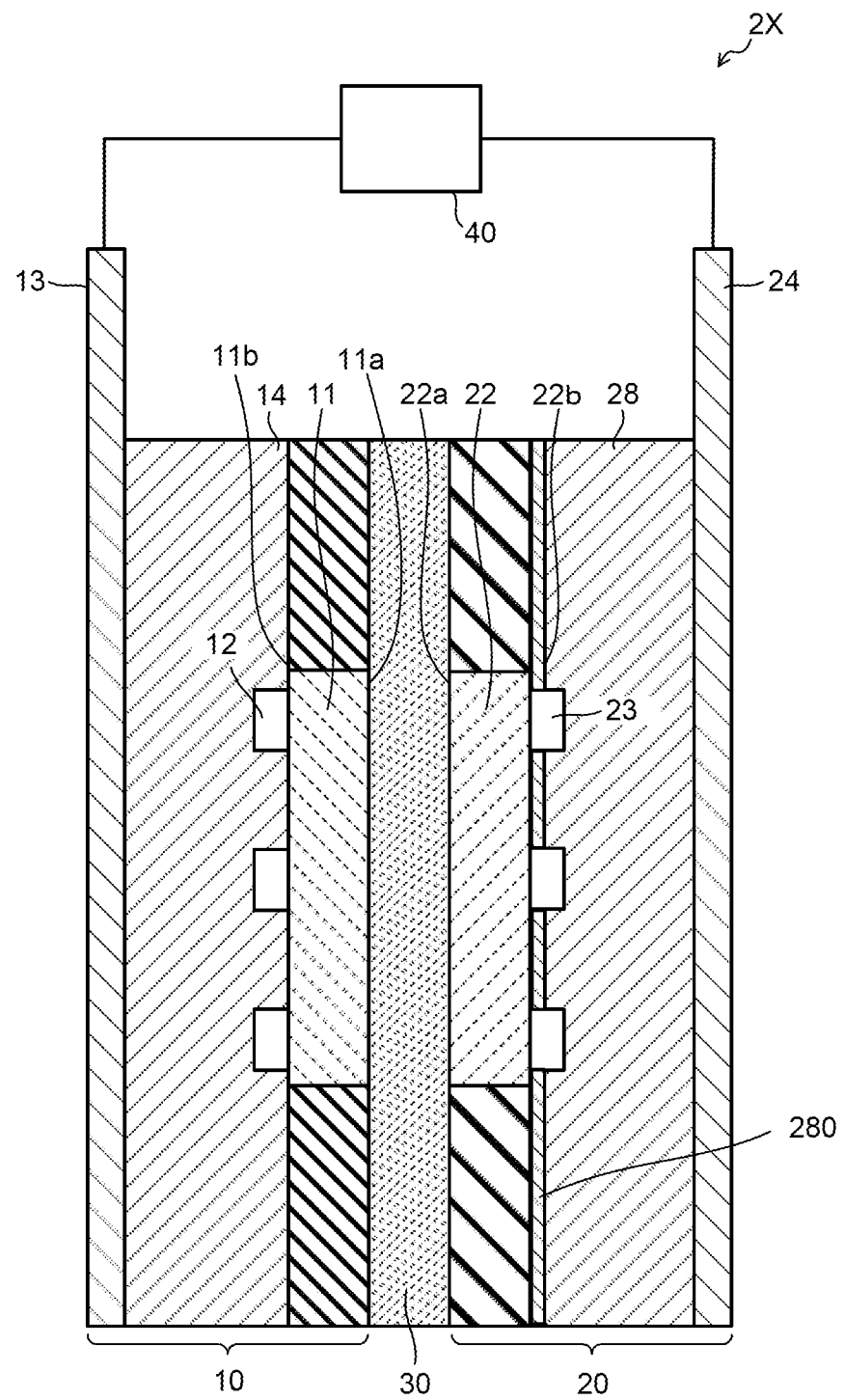
FIG. 20 is a cross-sectional diagram illustrating an electrolysis cell of the carbon dioxide electrolytic device illustrated in FIG. 19.

FIG. 19 is a diagram illustrating a configuration of a carbon dioxide electrolytic device according to a second embodiment, and FIG. 20 is a cross-sectional diagram illustrating a configuration of an electrolysis cell in the electrolytic device illustrated in FIG. 19. A carbon dioxide electrolytic device 1X illustrated in FIG. 19 includes an electrolysis cell 2X, the anode solution supply system 100 that supplies the anode solution to the electrolysis cell 2X, the gas supply system 300 that supplies carbon dioxide ($CO_2$) gas to the electrolysis cell 2X, the product collection system 400 that collects products produced by the reduction reaction in the electrolysis cell 2X, the control system 500 that detects the type and the production amount of the collected products, and performs control of the products and control of the refresh operation, the waste solution collection system 600 that collects the waste solution of the anode solution, and the refresh material supply unit 700 that restores the anode, the cathode, and the like of the electrolysis cell 2X in the same manner as the carbon dioxide electrolytic device 1 of the first embodiment.

The carbon dioxide electrolytic device 1X illustrated in FIG. 19 has basically the same configuration as the electrolytic device 1 illustrated in FIG. 1, except for the difference in the configuration of the electrolysis cell 2X. The electrolysis cell 2X includes the anode part 10, the cathode part 20, and the separator 30, as illustrated in FIG. 20. The anode part 10 includes the anode 11, the anode flow path 12, and the anode current collector 13. The cathode part 20 includes the cathode 22, the cathode flow path 23, and the cathode current collector 24, and does not include the cathode flow path 21. Therefore, components to supply the cathode solution to the cathode flow path 21 are not necessary. The power supply control unit 40 is connected to the anode 11 and cathode 22 through the current introduction member.

The anode 11 preferably has the first surface 11a in contact with the separator 30, and the second surface 11b facing the anode flow path 12. The first surface 11a of the anode 11 is in close contact with the separator 30. The anode flow path 12 is formed of a pit (groove portion/recessed portion) provided at the flow path plate 14. The anode solution flows through the inside of the anode flow path 12 in a manner to be in contact with the anode 11. The anode current collector 13 is in electrical contact with a surface of the flow path plate 14 that forms the anode flow path 12 on a side opposite to the anode 11. The cathode 22 has the first surface 22a in contact with the separator 30, and the second surface 22b facing the cathode flow path 23. The cathode flow path 23 is formed of a pit (groove portion/recessed portion) provided at the flow path plate 28. The cathode current collector 24 is in electrical contact with a surface of the flow path plate 28 which forms the cathode flow path 23 on a side opposite to the cathode 22.

The flow path plate 28 has the hydrophilic region 280 as in the first embodiment. The description of the hydrophilic region 280 can be adapted appropriately from the description of the first embodiment.

The gaseous substance supply system 710 and the rinse solution supply system 720 of the refresh material supply unit 700 are connected to the anode flow path 12 and cathode flow path 23 through pipes. The anode flow path 12 and cathode flow path 23 are connected to the waste solution collection system 600 through pipes. The rinse solutions discharged from the anode flow path 12 and cathode flow path 23 are collected into the waste solution collection tank 601 of the waste solution collection system 600. The gas for refreshing discharged from the anode flow path 12 and cathode flow path 23 is collected into a not-illustrated waste gas collection tank through the waste solution collection system 600 or is released into the atmosphere. Composing materials or the like of each part are the same as in the electrolytic device 1 of the first embodiment, and the details are as described above.

The cathode solution tank 202 functions as a cathode discharge solution tank housing the liquid such as the rinse solution discharged from the cathode flow path 23 during the refresh operation, for example. A tank 106 may be connected to the cathode flow path 23 through the cathode solution tank 202 and the refresh material supply unit 700. This allows the liquid to be used as the rinse solution when the tank 106 houses the liquid.

In the electrolytic device 1X of the second embodiment, the startup step S101 of the electrolytic device 1X and the $CO_2$ electrolysis operation step S102 are performed in the same manner as the electrolytic device 1 of the first embodiment, except that the cathode solution is not supplied. The reduction reaction of $CO_2$ at the cathode 22 is carried out by $CO_2$ supplied from the cathode flow path 23 and the anode solution that permeates the cathode 22 through the separator 30. The step S103 to judge whether the cell performance meets the required criteria is also performed in the same manner as the electrolytic device 1 of the first embodiment. When it is judged that the cell performance does not meet the required criteria, the refresh operation step S105 is performed. In the electrolytic device ix of the second embodiment, the refresh operation step S105 is performed as follows.

First, the $CO_2$ reduction reaction is stopped. At this time, the application of the bath voltage by the power supply control unit 40 may be maintained or stopped. Next, the anode solution is discharged from the anode flow path 12. Next, the rinse solution is supplied from the rinse solution supply system 720 to the anode flow path 12 and cathode flow path 23, to wash the anode 11 and cathode 22. While the rinse solution is being supplied, the refresh voltage may be applied between the anode 11 and cathode 22 as in the first embodiment. Next, gas is supplied from the gaseous material supply system 710 to the anode flow path 12 and cathode flow path 23 to dry the anode 11 and cathode 22. The gas and rinse solution used in the refresh operation step are the same as in the first embodiment. After the above refresh operation is completed, the anode solution is introduced into the anode flow path 12, and $CO_2$ gas is introduced into the cathode flow path 23. Then, the $CO_2$ electrolysis operation is restarted. When the application of the bath voltage by the power supply control unit 40 has been stopped, it is restarted.

Also in the electrolytic device 1X of the second embodiment, it is judged whether the $CO_2$ electrolysis operation is continued or the refresh operation is performed based on whether the cell performance of the electrolysis cell 2X meets the request criteria. Supplying the rinse solution and gas in the refresh operation step eliminates uneven distribution of ions near the anode 11 and cathode 22, which is a factor in lowering the cell performance, as well as the excess water at the cathode 22, the precipitation of electrolytes in the anode 11 and cathode 22, and the resulting blockage of the flow path. Therefore, the cell performance of the electrolysis cell 2X can be restored by restarting the $CO_2$ electrolysis operation after the refresh operation step. The $CO_2$ electrolysis performance by the electrolytic device 1X can be maintained for a long time by repeating the $CO_2$ electrolysis operation and the refresh operation based on the request criteria of the cell performance.

When the liquid passes through the separator 30 due to relatively low pressure, for example, a hydrophilic polytetrafluoroethylene (PTFE) porous body is used to supply the rinse solution only to the anode flow path 12, and the liquid at an anode outlet is pressurized or the anode outlet is blocked with a not-illustrated valve, or the like. The rinse solution then passes through the separator 30 and flows to the cathode 22, and the rinse solution flows out of the discharge port of the cathode 22. This allows the cathode 22 and anode 11 to be refreshed simultaneously. This configuration is preferable because it does not require a device to make the rinse solution flow through the cathode 22, making the system more compact and simplifying the system.

Piping for introducing air gas may be connected to the cathode 22. During refreshing, a water electrolysis reaction may be carried out by supplying gas containing air to the cathode 22 and applying the refresh voltage between the anode 11 and cathode 22. On the anode 11 side, oxygen is generated by an oxidation catalyst, and resulting protons move to the cathode 22 through the separator 30 or the electrolyte membrane. At the cathode 22, the protons and oxygen in the air react by a cathode catalyst to produce water. This produced water can dissolve and discharge salts from the cathode. Since the produced water is pure water, it can be used to wash the cathode 22. In this case, impurities in the cathode 22 can be reduced by the protons moved to the cathode 22, and the catalyst and members can be regenerated. This configuration is preferable because it does not require a device to supply the rinse solution to the cathode 22, making the device more compact and also simplifying the system. When the air passing through the cathode is stopped before the $CO_2$ gas is subsequently passed through, the produced protons react with each other to produce hydrogen, and the resulting water can also be pushed out. Stopping the oxygen-containing gas before pushing it out with $CO_2$ allows the regeneration function of the catalyst and members by protons to be more effective. This is because the absence of oxygen reduces other hard-to-reduce catalysts and each member of the cathode 22. Concretely, there are organic matters being impurities, metal oxides, and the like. After that, $CO_2$ is supplied to react with them for a more refreshing effect.

Figure 21:
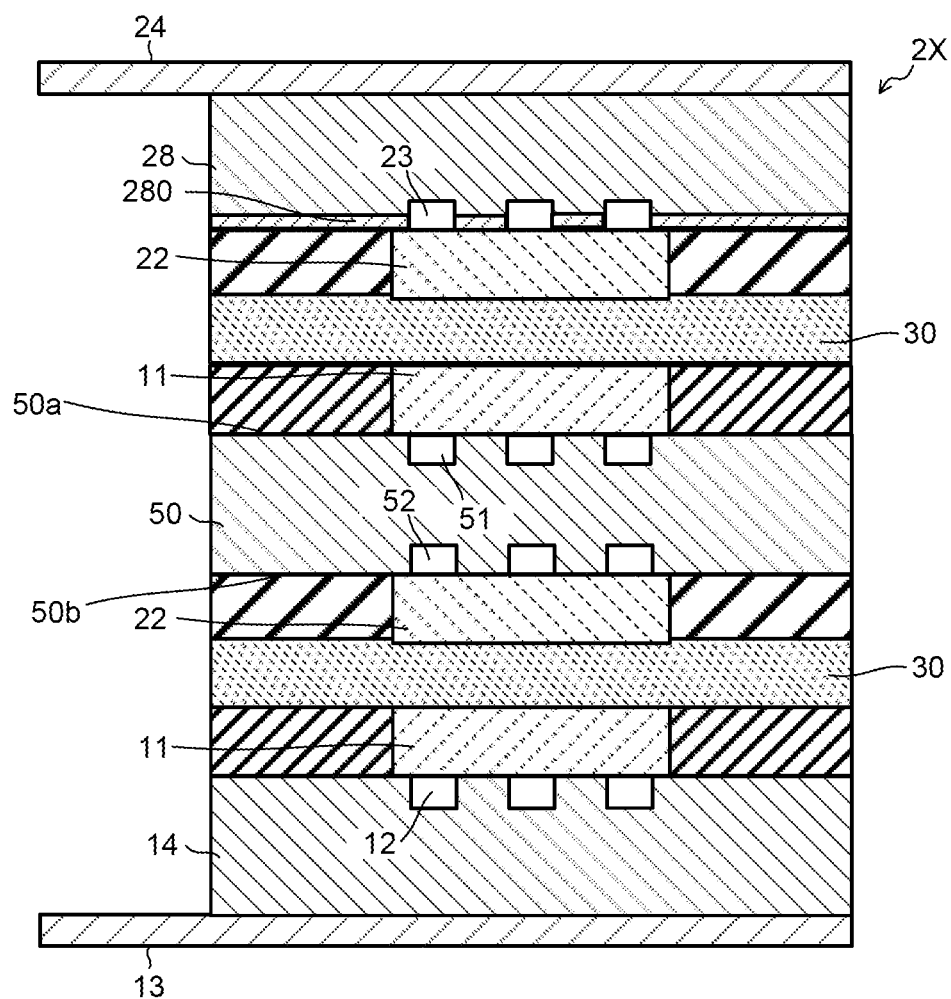
FIG. 21 is a diagram illustrating another cross-sectional structural example of the electrolysis cell illustrated in FIG. 19.

A structure of the electrolysis cell 2X is not limited to the structure illustrated in FIG. 20. FIG. 21 is a cross-sectional schematic diagram illustrating another structural example of the electrolysis cell 2X. The electrolysis cell 2X illustrated in FIG. 21 is different from the electrolysis cell 2X illustrated in FIG. 20 in a point that a plurality of anodes 11, a plurality of cathodes 22, a plurality of separators 30, and a flow path plate 50 are included. The different portions are described below.

Each of the anodes 11, each of the separators 30, and each of the cathodes 22 are laminated in turn to form an electrolysis cell. The description of the anode 11, separator 30, and cathode 22 can be adapted appropriately from the description of the first embodiment.

The flow path plate 50 is provided between one of the plurality of anodes 11 and one of the plurality of cathodes 22. The flow path plate 50 has a flow path 51 provided on a surface 50a and a flow path 52 provided on a surface 50b. The flow path plate 50 is also referred to as a bipolar flow path plate.

The flow path 51 faces one of the plurality of anodes 11. The flow path 51 functions as an anode flow path (anode solution flow path) through which the anode solution flows. The rest of the description of the flow path 51 can be adapted appropriately from the description of the anode flow path 12.

The flow path 52 faces one of the plurality of cathodes 22. The flow path 52 functions as a cathode flow path (gas flow path) through which carbon dioxide flows. The rest of the description of the flow path 52 can be adapted appropriately from the description of the cathode flow path 23.

The flow path plate 50 is formed by a hydrophilic porous body. The description of the hydrophilic porous body can be adapted appropriately from the description of the first embodiment.

In the flow path plate 50, a hydrophilic porous region is formed between the flow path 51 and flow path 52. This allows the anode solution to move from the flow path 51 to flow path 52 and humidify the flow path 52. Although the flow path plate is porous, surface tension is lowered, the porous body is filled with water, and gas does not permeate through by making the flow path plate hydrophilic, so no gas leakage occurs and it can be used as a flow path plate. It is also effective in absorbing condensed water and uniformly humidifying the inside of the cell. The same effect can be achieved with cooling water if the cooling water is passed through inside or on a surface of the flow path plate 50. In addition, electrolytic solution components that have moved from the anode 11 to cathode 22 and precipitated can be returned to the anode 11. The anode solution has a problem that a concentration thereof decreases as the electrolytic solution components move to the cathode 22 due to the reaction. The hydrophilic porous region allows the electrolytic solution components to be returned from the cathode 22 to anode 11, improving stability over long periods of operation.

Figure 22:
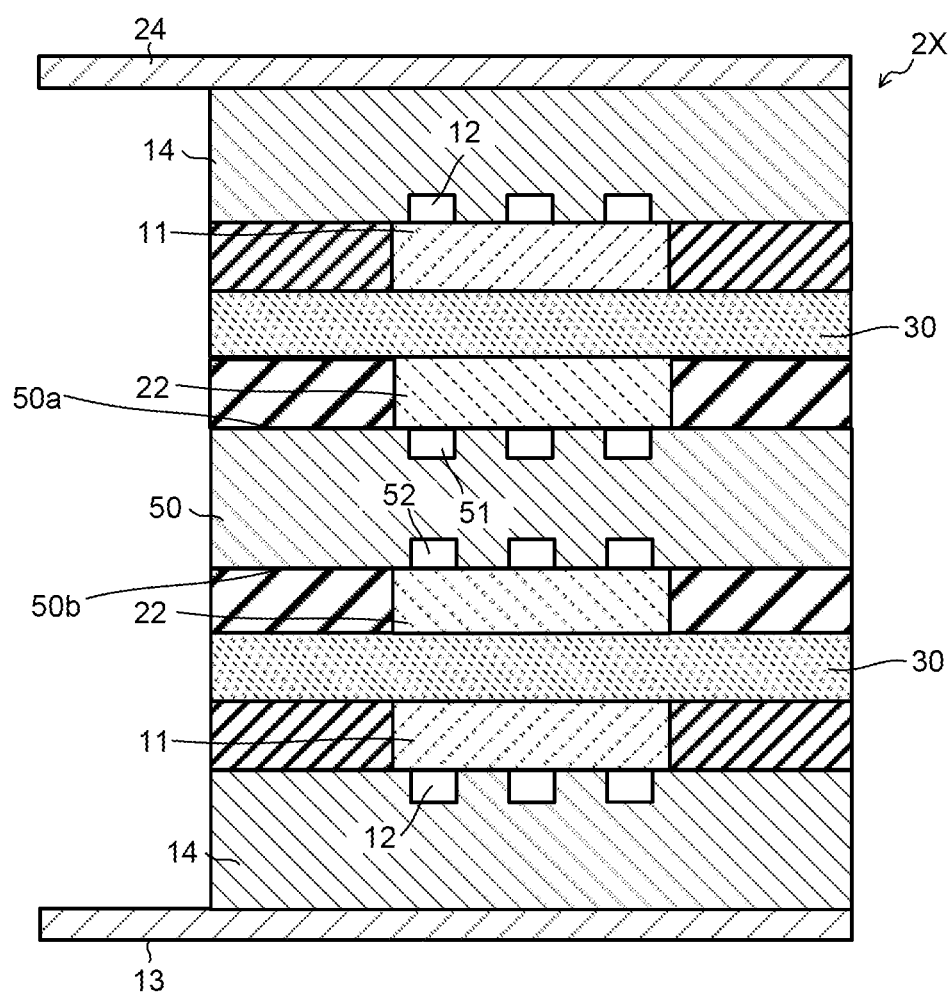
FIG. 22 is a diagram illustrating still another cross-sectional structural example of the electrolysis cell illustrated in FIG. 19.

As illustrated in FIG. 22, the flow path 51 may face another one of the plurality of cathodes 22. In this case, an inlet of the flow path 52 is preferably closer to an outlet of the flow path 51 than an outlet of the flow path 52 is, and the outlet of the flow path 52 is preferably closer to the outlet of the flow path 51 than the inlet of the flow path 52 is. This allows water to move between the flow paths 51 and 52 to uniformly humidify the flow paths 51 and 52.

The configuration of the second embodiment can be combined with the configuration of the first embodiment as appropriate. For example, the configuration of the electrolysis cell 2 illustrated in FIG. 1 may be changed to the configuration illustrated in FIG. 21 or FIG. 22.

EXAMPLES

Example 1

The electrolytic device illustrated in FIG. 1 was assembled, and electrolysis performance of carbon dioxide was examined. A cathode in which carbon particles carrying gold nanoparticles were applied to carbon paper having a porous layer was fabricated by the following procedure. A coating solution was fabricated by mixing the carbon particles carrying the gold nanoparticles, pure water, a Nafion solution, and ethylene glycol. An average particle diameter of the gold nanoparticles was 8.7 nm, and a carried amount thereof was 18.9 mass %. The coating solution was filled in an airbrush and subjected to spray coating onto the carbon paper provided with the porous layer by using nitrogen gas. After the coating, the carbon paper was washed with flowing pure water for 30 minutes and thereafter immersed in a hydrogen peroxide solution, whereby organic matters such as ethylene glycol were oxidized and removed. This was cut into a size of 2×2 cm to be used as the cathode. Note that a coating amount of Au was estimated as about 0.2 mg/cm² based on a mixing amount of the gold nanoparticles and the carbon particles in the coating solution. For the anode, an electrode in which $IrO_2$ nanoparticles to be a catalyst were applied to Ti nonwoven fabric was used. $IrO_2$/Ti mesh cut into 2×2 cm was used as the anode. A catalyst area was 2 cm×2 cm=4 cm². An area of the cathode catalyst layer 22B on a contact surface with the surface 28a was 4 cm², while a distance between the inlet IN and outlet OUT was 0.8 cm. The distance between the inlet IN and outlet OUT/√ the area of the cathode catalyst layer 22B=0.2.

Figure 23:
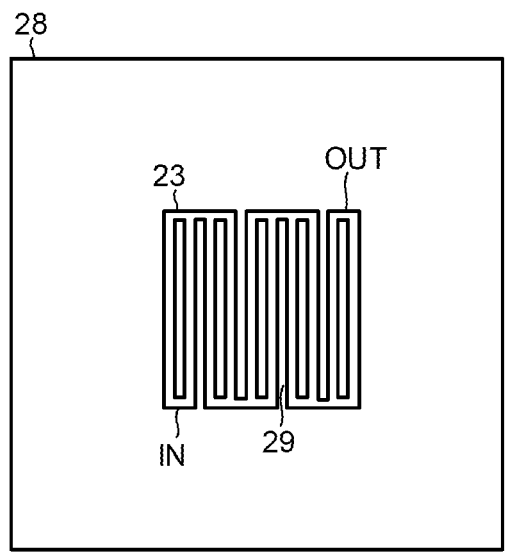
FIG. 23 is a diagram illustrating a planar shape of a cathode flow path in Example 1.

As illustrated in FIG. 2, the electrolysis cell 2 was fabricated in a manner that the cathode current collector 24, the cathode flow path 23 (flow path plate 28), the cathode 22, the cathode flow path 21 (flow path plate 25), the separator 30, the anode 11, the anode flow path 12, and the anode current collector 13 were laminated in this order from the top, and the stack was sandwiched between not-illustrated support plates and tightened by the bolts. For the separator 30, an anion-exchange membrane (product name: Selemion) was used. The $IrO_2$/Ti mesh of the anode 11 was brought into close contact with the anion-exchange membrane. A thickness of the cathode flow path 23 was set to 1 mm. The flow path plate 28 was made of titanium. The cathode flow path 23 was fabricated by cutting the flow path plate 28. A planar shape of the cathode flow path 23 is illustrated in FIG. 23. The planar shape of the cathode flow path 23 was serpentine and had four folded portions. The cathode flow path 23 had four pairs of parallel flow regions that were connected in parallel on the surface 28a. A width of the cathode flow path 23 was 1 mm. A depth of the cathode flow path 23 in a thickness direction of the flow path plate 28 was 1 mm. A width of the land 29 was 1 mm.

A contact surface of the flow path plate 28 with the gas diffusion layer 22A had the hydrophilic region 280 with a surface roughness (width of each of irregularities) of 20 nm or more and 30 μm or less through surface treatment. An average roughness (arithmetic mean roughness) of the surface of the hydrophilic region 280 was about 4±1 μm. A contact angle of the hydrophilic region 280 to pure water was 20 degrees or more and 40 degrees or less. A contact angle of the rest of the surface 28a of the flow path plate 28 to pure water was 45 degrees. An evaluation temperature was set at the room temperature.

The electrolytic device 1 illustrated in FIG. 1 was assembled using the above-described electrolysis cell 2, and the electrolytic device was operated under the following conditions. $CO_2$ gas was supplied to the cathode flow path 23 of the electrolysis cell 2 at 20 sccm, an aqueous potassium hydroxide solution (concentration of 1 M KOH) was supplied to the cathode flow path 21 at a flow rate of 5 mL/min, and the aqueous potassium hydroxide solution (concentration of 1 M KOH) was supplied to the anode flow path 12 at a flow rate of 20 mL/min. Next, a constant current of 800 mA was applied between the anode 11 and cathode 22 at a constant current density of 200 mA/cm² by controlling a voltage by using the power supply control unit to cause an electrolytic reaction of $CO_2$, and a cell voltage at that time was measured and collected by the data collector and controller. Further, part of gas output from the cathode flow path 23 was collected, and production amounts of CO gas produced by the reduction reaction of $CO_2$ and $H_2$ gas produced by the reduction reaction of water were analyzed by a gas chromatograph. A partial current density of CO or $H_2$ and the Faradaic efficiency being a ratio between an entire current density and a partial current density were calculated and collected by the data collector and controller based on the gas production amounts. Results are listed in Table 1.

Example 2

The carbon dioxide electrolytic device was assembled in the same manner as Example 1, and the electrolysis performance of carbon dioxide was examined. Different from Example 1, the hydrophilic region 280 was formed by attaching hydrophilic carbon powder only on portions of the surface 28a of the flow path plate 28 that were in contact with the gas diffusion layer 22. The hydrophilic region 280 had the surface roughness of 20 nm or more and 10 μm or less, and the average roughness was about 3±1 μm. The contact angle of the hydrophilic region 280 to pure water was 10 degrees or more and 30 degrees or less. The contact angle of the rest of the surface 28a of the flow path plate 28 to pure water was 45 degrees.

Example 3

Figure 24:
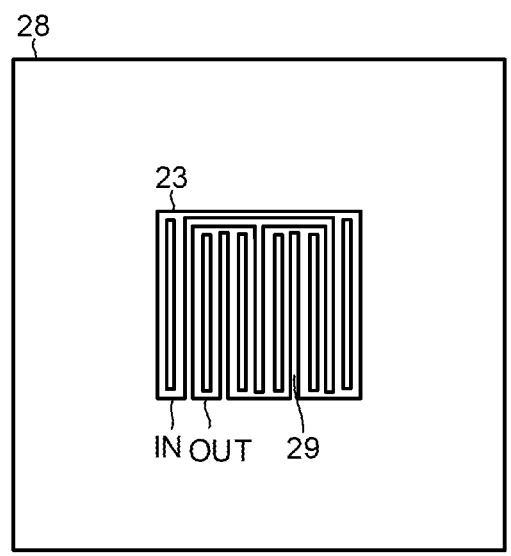
FIG. 24 is a diagram illustrating a planar shape of a cathode flow path in Example 3.

The carbon dioxide electrolytic device was assembled in the same manner as Example 1, and the electrolysis performance of carbon dioxide was examined. Different from Example 1, the inlet IN and outlet OUT of the cathode flow path 23 were placed adjacent to each other as illustrated in FIG. 24. The planar shape of the cathode flow path 23 was serpentine and had five folded portions. The cathode flow path 23 had six pairs of parallel flow path regions that were connected in parallel on the surface 28a. The area of the cathode catalyst layer 22B at the contact surface with the surface 28a was 2 cm×2 cm=4 cm², while the distance between the inlet IN and outlet OUT was 0.4 cm, and the distance between the inlet IN and outlet OUT/√ the plane area of the cathode catalyst layer 22B=0.2. The rest was the same as in Example 2.

Example 4

The carbon dioxide electrolytic device was assembled in the same manner as Example 1, and the electrolysis performance of carbon dioxide was examined. The inlet IN and outlet OUT of the cathode flow path 23 were placed adjacent to each other in the same manner as Example 3. Further, different from Example 3, the hydrophilic region 280 was formed on the surface 28a along a flow path region from the inlet of the cathode flow path 23 to a portion having a length of ⅓ of a total flow path length in a length direction by attaching carbon powder to the surface 28a of the flow path plate 28.

Example 5

The carbon dioxide electrolytic device was assembled in the same manner as Example 1, and the electrolysis performance of carbon dioxide was examined. Different from Example 1, the surface of the flow path plate 28 was processed to form the hydrophilic region 280 with the surface roughness of 2 μm and the maximum height of 20 μm. The average roughness of the hydrophilic region 280 was about 6±1 μm. The contact angle at this time of the hydrophilic region 280 to pure water was 30 degrees.

Example 6

The carbon dioxide electrolytic device was assembled in the same manner as Example 1, and the electrolysis performance of carbon dioxide was examined. Different from Example 1, a plurality of anodes 11 and a plurality of cathodes 22 were held. A bipolar flow path plate was fabricated with a hydrophilic porous carbon plate, and the flow path 51 facing one of the plurality of cathodes was formed on one surface of the bipolar flow path plate, and the flow path 52 facing one of the plurality of anodes was formed on the other surface. The hydrophilic porous carbon plate had the average pore size of 10 nm or more and 1 μm or less and the porosity of 30%. The contact angle of the hydrophilic porous carbon plate to pure water was 15 degrees or less.

Example 7

The carbon dioxide electrolytic device was assembled in the same manner as Example 1, and the electrolysis performance of carbon dioxide was examined. Different from Example 1, the surface 28a of the flow path plate 28 and a region from the surface 28a of the inner wall surface of the cathode flow path 23 to ⅓ of the thickness of the flow path plate 28 was processed to form the hydrophilic region 280 with the surface roughness of 2 μm and the maximum height of 20 μm. The average roughness of the hydrophilic region 280 was about 6±1 μm. The contact angle of the hydrophilic region 280 to pure water was 30 degrees.

Example 8

Figure 25:
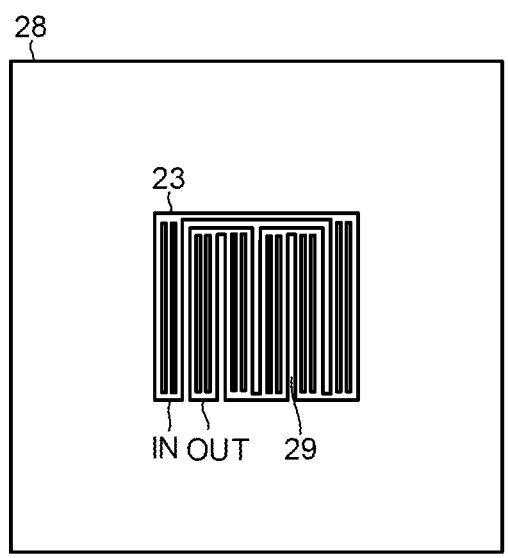
FIG. 25 is a diagram illustrating a planar shape of a cathode flow path in Example 8.

The carbon dioxide electrolytic device was assembled in the same manner as Example 1, and the electrolysis performance of carbon dioxide was examined. Different from Example 1, the inlet IN and outlet OUT of the cathode flow path 23 are placed adjacent to each other as illustrated in FIG. 25. The plane area of the cathode catalyst layer 22B was 2 cm×2 cm=4 cm$^2$, while the distance between the inlet IN and outlet OUT was 0.6 cm, and the distance between the inlet IN and outlet OUT/V the plane area of the cathode catalyst layer 22B=0.3. The planar shape of the cathode flow path 23 was serpentine and had five folded portions. The cathode flow path 23 had six parallel flow regions with three parallel connections on the surface 28a.

Comparative Example 1

The carbon dioxide electrolytic device was assembled in the same manner as Example 1, and the electrolysis performance of carbon dioxide was examined. Different from Example 1, the surface 28a of the flow path plate 28 on the gas diffusion layer 22A side had the surface roughness of 1 μm or less, and the average roughness was about 0.1 to 2 μm. The contact angle of the surface 28a to pure water was 45 degrees. Other than the above, the same conditions were used.

Comparative Example 2

The carbon dioxide electrolytic device was assembled in the same manner as Example 1, and the electrolysis performance of carbon dioxide was examined. Different from Example 1, water-repellent treatment by a conductive polymer was applied to the surface of the surface 28a. The contact angle of this surface to pure water was 90 degrees.

Table 1 lists the cell voltages and the Faradaic efficiencies of CO and $H_2$ collected after about 5 hours have passed in Examples 1 to 8, and Comparative Examples 1 and 2. Table 1 also lists the time until the cathode flow path 23 is blocked (the time until the pressure in the cathode flow path 23 exceeds 0.3 MPa). The pressure of 0.3 MPa indicates that the flow path is blocked compared to the pressure loss of the flow path used in normal electrolysis. Immediately after the pressure in the cathode flow path 23 exceeded 0.3 MPa, the flow rate also became zero. The flow rate became zero immediately after the cathode pressure exceeded 0.3 MPa also in each of Comparative Examples and Examples. Therefore, the time until the cathode flow path 23 was blocked was specified by the time when the cathode pressure exceeded 0.3 MPa.

TABLE 1

|  | Time until cathode flow path 23 is blocked | Faradaic efficiency CO (%) | Faradaic efficiency H2 (%) | Cell voltage (V) |
| --- | --- | --- | --- | --- |
| Example 1 | 30 hours | 94.0 | 5.0 | 2.75 |
| Example 2 | 29.5 hours | 95.0 | 4.2 | 2.73 |
| Example 3 | 42 hours | 96.0 | 2.7 | 2.70 |
| Example 4 | 54 hours | 96.0 | 2.5 | 2.69 |
| Example 5 | Not blocked after 100 hours of continuous operation | 97.5 | 1.5 | 2.69 |
| Example 6 | Not blocked after 100 hours of continuous operation | 97.5 | 1.5 | 2.68 |
| Example 7 | Not blocked after 100 hours of continuous operation | 97.7 | 1.3 | 2.68 |
| Example 8 | 37 hours | 95.0 | 4.5 | 2.70 |
| Comparative Example 1 | 8.5 hours | 85.0 | 13.0 | 2.82 |
| Comparative Example 2 | 6.2 hours | 82.0 | 15.0 | 2.85 |

The results of Examples 1 to 8, as well as Comparative Examples 1 and 2, show that the time until the cathode flow path 23 is blocked can be extended by forming the hydrophilic region 280. In addition, the cell voltage and the Faradaic efficiency of CO are increased, thereby improving the electrolysis efficiency.

Note that the configurations of the aforementioned respective embodiments can be mutually combined to be carried out, and a part thereof can be substituted. Here, while certain embodiments of the present invention have been described, these embodiments have been presented by way of example only, and are not intended to limit the scope of the inventions. The embodiments described herein may be embodied in a variety of other forms, furthermore, various omissions, substitutions, changes, and so on may be made therein without departing from the spirit of the inventions. The accompanying claims and their equivalents are intended to cover such forms or modifications as would fall within the scope and spirit of the inventions.

What is claimed is:

1. A carbon dioxide electrolytic device, comprising an electrolysis cell,
the cell comprising:
an anode configured to oxidize water to produce oxygen;
a cathode configured to reduce carbon dioxide to produce a carbon compound;
a cathode flow path plate having a surface and a cathode flow path, the surface being provided on the cathode, and the cathode flow path being provided on the surface and facing to the cathode; and
a separator provided between the anode and the cathode, wherein
the surface has a hydrophilic region, the hydrophilic region being provided on the cathode and having a contact angle to water of less than 45 degrees, and
the hydrophilic region is a porous region having an average pore size of 0.1 μm or more and 10 μm or less.

2. The device according to claim 1, wherein
the cathode has:
a catalyst layer containing a reduction catalyst configured to reduce the carbon dioxide to produce the carbon compound; and
a gas diffusion layer provided on the catalyst layer, wherein
the hydrophilic region is in contact with the gas diffusion layer.

3. The device according to claim 1, wherein
the cathode flow path includes:
a first flow path region; and
a second flow path region being away from the first flow path region, and the hydrophilic region is provided between the first flow path region and the second flow path region on the surface.

4. The device according to claim 1, wherein the hydrophilic region extends on the surface along a region from an inlet of the cathode flow path to a portion having a length of ⅓ of a total flow path length of the cathode flow path in a length direction thereof.

5. The device according to claim 1, wherein the hydrophilic region is provided on the entire surface.

6. The device according to claim 1, wherein an outlet of the cathode flow path is provided adjacent to the inlet of the cathode flow path on the surface.

7. The device according to claim 1, further comprising:
a carbon dioxide supply unit configured to supply carbon dioxide to the cathode;
an electrolytic solution supply unit configured to supply an electrolytic solution containing water to at least one selected from the group consisting of the anode and the cathode;
a power supply control unit connected to the anode and the cathode, the power supply control unit being configured to apply a voltage between the anode and the cathode;
a refresh material supply unit having: a gas supply unit configured to supply gaseous substances to at least one selected from the group consisting of the anode and the cathode; and
a rinse solution supply unit configured to supply a rinse solution to at least one selected from the group consisting of the anode and the cathode; and
a control unit configured to control stopping the supply of the carbon dioxide by the carbon dioxide supply unit, stopping the supply of the electrolytic solution by the electrolytic solution supply unit, and supplying the rinse solution to at least one selected from the group consisting of the anode and the cathode by the refresh material supply unit, in accordance with request criteria of performance of the cell.

8. A carbon dioxide electrolytic device, comprising an electrolysis cell,
the cell comprising:
an anode configured to oxidize water to produce oxygen;
a cathode configured to reduce carbon dioxide to produce a carbon compound;
a cathode flow path plate having a surface and a cathode flow path, the surface being provided on the cathode, and the cathode flow path being provided on the surface and facing to the cathode; and
a separator provided between the anode and the cathode, wherein
the surface has a hydrophilic region, the hydrophilic region being provided on the cathode and having a contact angle to water of less than 45 degrees, and
the hydrophilic region is an uneven region having an arithmetic mean roughness of 10 nm or more and 30 μm or less.

9. The device according to claim 8, wherein the cathode has:
a catalyst layer containing a reduction catalyst configured to reduce the carbon dioxide to produce the carbon compound; and
a gas diffusion layer provided on the catalyst layer, wherein
the hydrophilic region is in contact with the gas diffusion layer.

10. The device according to claim 8, wherein the cathode flow path includes:
a first flow path region; and
a second flow path region being away from the first flow path region, and
the hydrophilic region is provided between the first flow path region and the second flow path region on the surface.

11. The device according to claim 8, wherein the hydrophilic region extends on the surface along a region from an inlet of the cathode flow path to a portion having a length of ⅓ of a total flow path length of the cathode flow path in a length direction thereof.

12. The device according to claim 8, wherein the hydrophilic region is provided on the entire surface.

13. The device according to claim 8, wherein an outlet of the cathode flow path is provided adjacent to the inlet of the cathode flow path on the surface.

14. The device according to claim 8, further comprising:
a carbon dioxide supply unit configured to supply carbon dioxide to the cathode;
an electrolytic solution supply unit configured to supply an electrolytic solution containing water to at least one selected from the group consisting of the anode and the cathode;
a power supply control unit connected to the anode and the cathode, the power supply control unit being configured to apply a voltage between the anode and the cathode;
a refresh material supply unit having: a gas supply unit configured to supply gaseous substances to at least one selected from the group consisting of the anode and the cathode; and a rinse solution supply unit configured to supply a rinse solution to at least one selected from the group consisting of the anode and the cathode; and
a control unit configured to control stopping the supply of the carbon dioxide by the carbon dioxide supply unit, stopping the supply of the electrolytic solution by the electrolytic solution supply unit, and supplying the rinse solution to at least one selected from the group consisting of the anode and the cathode by the refresh material supply unit, in accordance with request criteria of performance of the cell.

15. A carbon dioxide electrolytic device, comprising an electrolysis cell,
the cell comprising:
a first anode configured to oxidize water to produce oxygen;
a first cathode configured to reduce carbon dioxide to produce a carbon compound;
a first separator provided between the first anode and the first cathode;
a second anode configured to oxidize water to produce oxygen;
a second cathode configured to reduce carbon dioxide to produce a carbon compound;
a second separator provided between the second anode and the second cathode; and
a first flow path plate having
a first surface provided on the first cathode,
a cathode flow path provided on the first surface and facing to the first cathode,
a second surface provided on the second anode,
an anode flow path provided on the second surface and facing to the second anode, and
a hydrophilic porous region provided between the cathode flow path and the anode flow path, the hydrophilic porous region having a contact angle to water of less than 45 degrees and an average pore size of 0.01 μm or more and 10 μm or less.

16. A carbon dioxide electrolytic device, comprising:
a first anode configured to oxidize water to produce oxygen;
a first cathode configured to reduce carbon dioxide to produce a carbon compound;
a first separator provided between the first anode and the first cathode;
a second anode configured to oxidize water to produce oxygen;
a second cathode configured to reduce carbon dioxide to produce a carbon compound;
a second separator provided between the second anode and the second cathode; and
a second flow path plate having
a first surface provided on the first cathode,
a first cathode flow path provided on the first surface and facing to the first cathode,
a second surface provided on the second cathode,
a second cathode flow path provided on the second surface and facing the second cathode, and
a hydrophilic porous region provided between the first cathode flow path and the second cathode flow path, the hydrophilic porous region having a contact angle to water of less than 45 degrees and an average pore size of 0.01 μm or more and 10 μm or less.

17. The device according to claim 16, wherein
an inlet of the second cathode flow path is closer to an outlet of the first cathode flow path than an outlet of the second cathode flow path is, and
the outlet of the second cathode flow path is closer to the outlet of the first cathode flow path than the inlet of the second cathode flow path is.

* * * * *